(12) United States Patent
Amano

(10) Patent No.: US 8,719,834 B2
(45) Date of Patent: May 6, 2014

(54) INFORMATION PROCESSING SYSTEM, METHOD, PROGRAM AND INTEGRATED CIRCUIT FOR MAINTAINING BALANCE OF PROCESSING LOADS WITH RESPECT TO REAL-TIME TASKS

(75) Inventor: Katsushige Amano, Kanagawa (JP)

(73) Assignee: Panasonic Corporation, Osaka (JP)

( * ) Notice: Subject to any disclaimer, the term of this patent is extended or adjusted under 35 U.S.C. 154(b) by 159 days.

(21) Appl. No.: 13/383,291

(22) PCT Filed: Apr. 20, 2011

(86) PCT No.: PCT/JP2011/002311
§ 371 (c)(1),
(2), (4) Date: Jan. 10, 2012

(87) PCT Pub. No.: WO2011/148563
PCT Pub. Date: Dec. 1, 2011

(65) Prior Publication Data
US 2012/0117567 A1 May 10, 2012

(30) Foreign Application Priority Data
May 24, 2010 (JP) ................................. 2010-117905

(51) Int. Cl.
G06F 9/455 (2006.01)
G06F 9/46 (2006.01)

(52) U.S. Cl.
USPC .......................................... 718/105; 718/103

(58) Field of Classification Search
None
See application file for complete search history.

(56) References Cited

U.S. PATENT DOCUMENTS 6,148,324 A * 11/2000 Ransom et al. ............... 718/105

7,664,931 B2 * 2/2010 Erforth et al. .................... 712/42
2002/0087611 A1 7/2002 Tanaka et al.
2003/0097393 A1 5/2003 Kawamoto et al.
2005/0102677 A1 * 5/2005 Gootherts ....................... 718/105
2005/0108717 A1 * 5/2005 Hong et al. ..................... 718/102

(Continued)

FOREIGN PATENT DOCUMENTS

| JP | 2000-242512 | 9/2000 |
| JP | 2002-202959 | 7/2002 |
| JP | 2003-157177 | 5/2003 |
| JP | 2008-152594 | 7/2008 |

OTHER PUBLICATIONS

International Search Report issued Jul. 5, 2011 in International (PCT) Application No. PCT/JP2011/002311.

*Primary Examiner* — Meng An
*Assistant Examiner* — Bradley Teets
(74) *Attorney, Agent, or Firm* — Wenderoth, Lind & Ponack, L.L.P.

(57) ABSTRACT

An information processing system that maintains balance in the processing loads between processors and that includes operating systems, which each perform execution control on processing tasks by assigning each task to a task group and causing all tasks in the same task group to be executed on the same processor, and a hypervisor that associates each processor with one or more task groups in the operating systems and causes each operating system to perform the execution control so that all tasks in the same task group are executed on the processor associated with the same task group. The hypervisor sequentially acquires load indicators indicating a processing load of each task group in each operating system, refers to the processing loads indicated by the sequentially acquired load indicators, and when determining that the processing loads are not balanced between the processors, re-associates the processors with the task groups.

14 Claims, 17 Drawing Sheets

(56) References Cited

U.S. PATENT DOCUMENTS

| | | |
|---|---|---|
| 2005/0149933 A1 | 7/2005 | Saito et al. |
| 2006/0101465 A1* | 5/2006 | Kato et al. .................. 718/100 |
| 2006/0288348 A1 | 12/2006 | Kawamoto et al. |
| 2007/0074216 A1* | 3/2007 | Adachi et al. ................. 718/102 |
| 2008/0034366 A1 | 2/2008 | Tanaka et al. |
| 2008/0148015 A1 | 6/2008 | Takamoto et al. |
| 2011/0083135 A1 | 4/2011 | Kawamoto et al. |
| 2012/0204183 A1* | 8/2012 | Bayer et al. ................... 718/102 |

* cited by examiner

FIG. 4A  BEFORE REALLOCATION
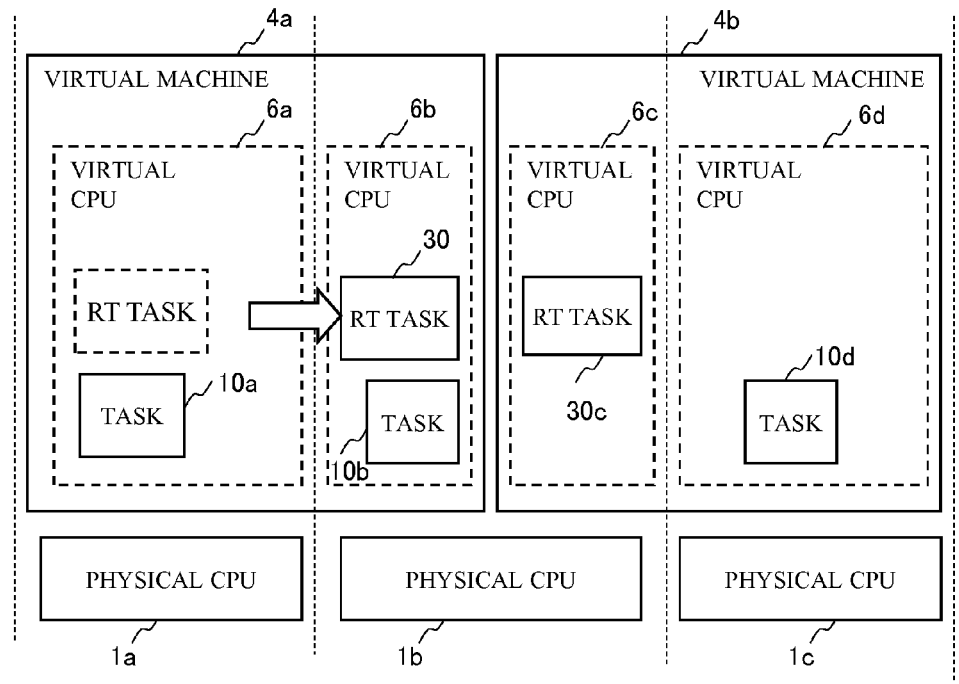
FIG. 4B  AFTER REALLOCATION
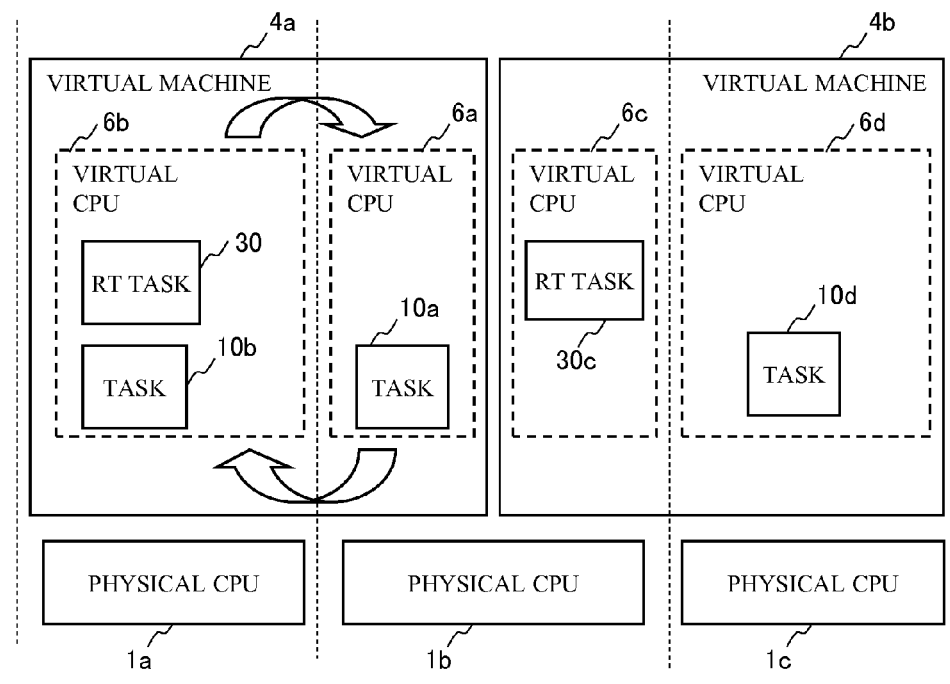

FIG.7A  BEFORE REALLOCATION
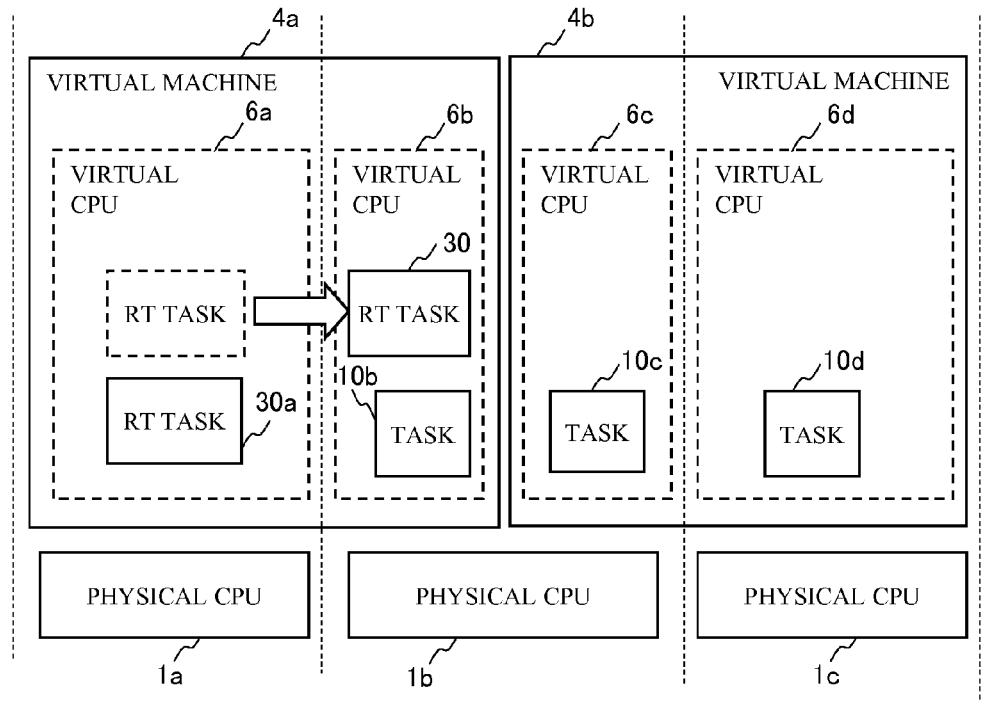
FIG.7B  AFTER REALLOCATION
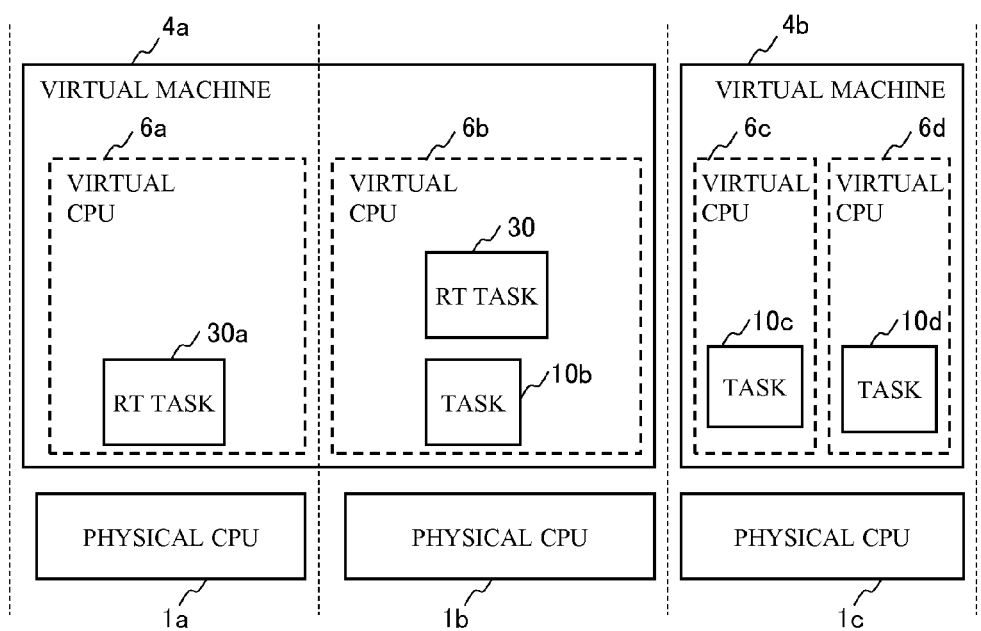

FIG.9A  BEFORE REALLOCATION
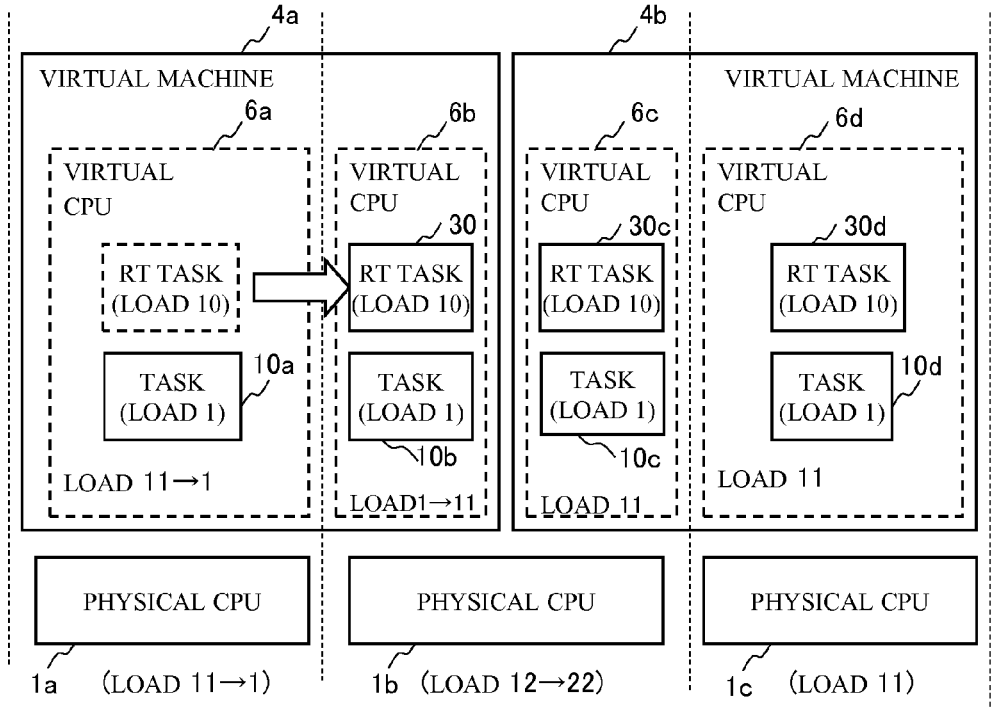
FIG.9B  AFTER REALLOCATION
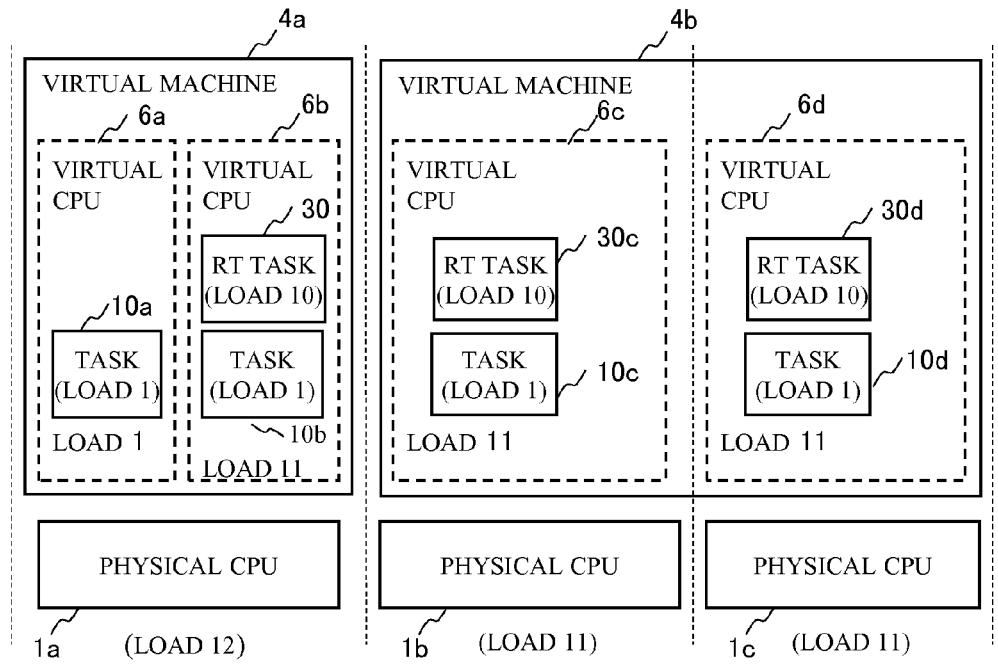

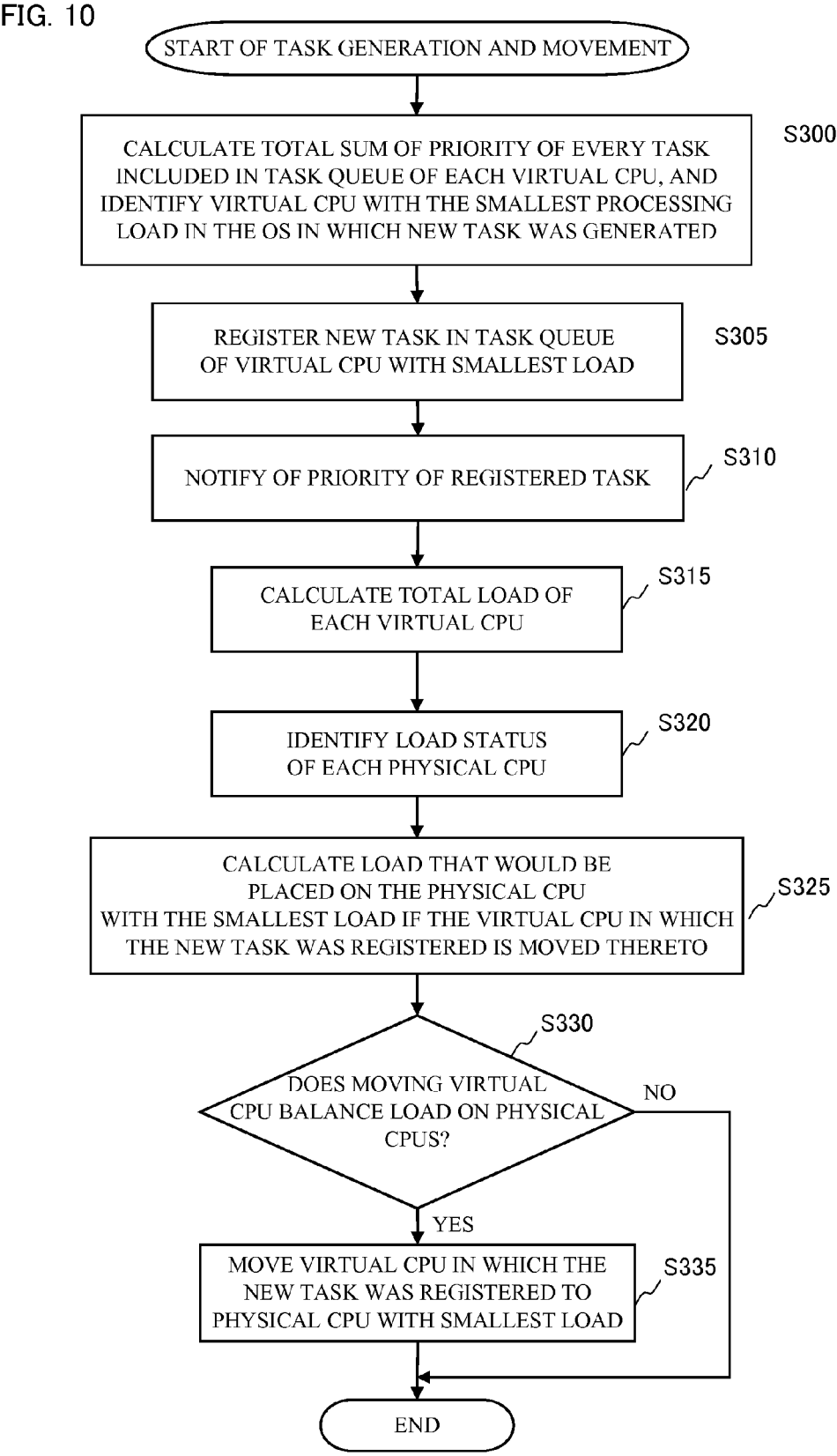

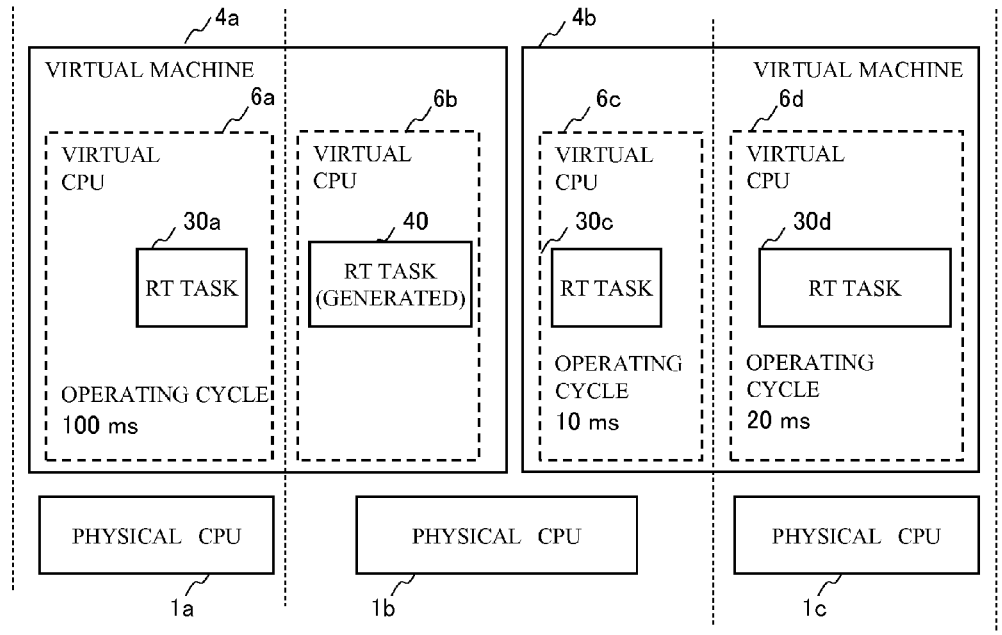
FIG.14A BEFORE REALLOCATION
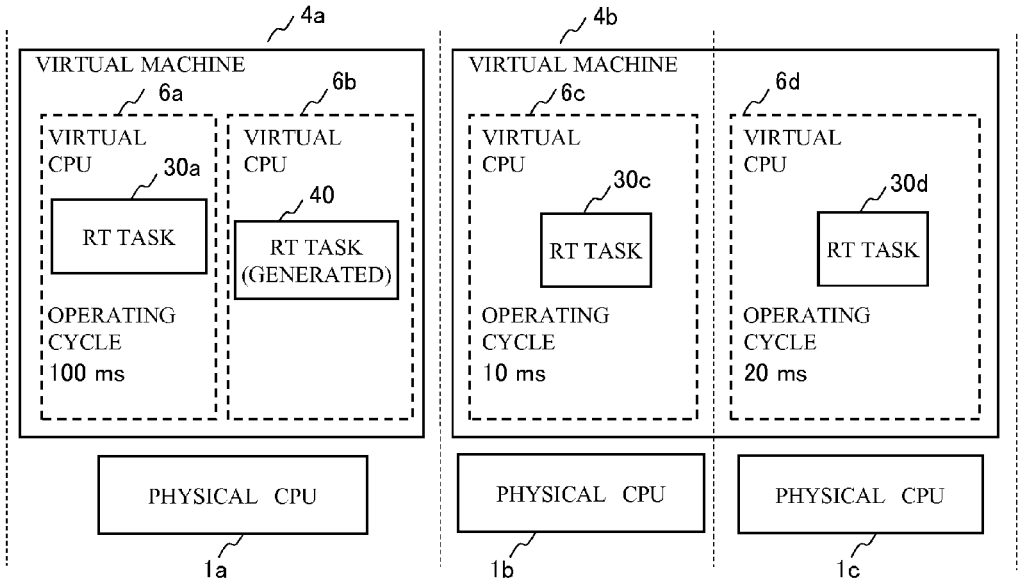
FIG.14B AFTER REALLOCATION

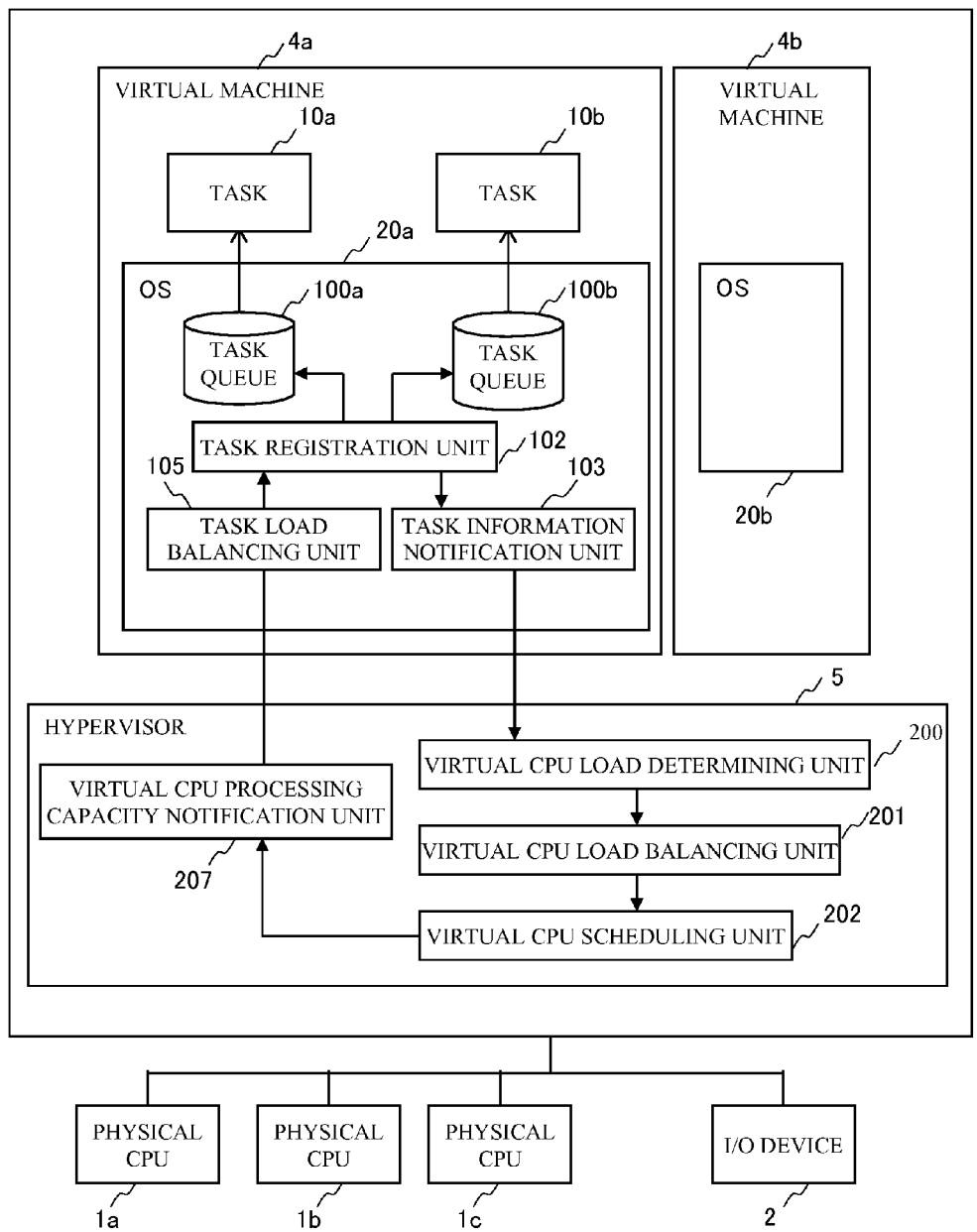

INFORMATION PROCESSING SYSTEM, METHOD, PROGRAM AND INTEGRATED CIRCUIT FOR MAINTAINING BALANCE OF PROCESSING LOADS WITH RESPECT TO REAL-TIME TASKS

BACKGROUND OF INVENTION

1. Technical Field

The present invention relates to technology which, in information processing system having a plurality of virtual CPUs, allocates the virtual CPUs to a plurality of physical CPUs.

2. Background Art

Technology exists for running a plurality of virtual machines on one physical machine. A virtual machine operates on a virtual Central Processing Unit (CPU), and virtual CPUs are allocated to physical CPUs by time sharing. Technology for virtual machines provides a management module for managing time sharing of physical CPUs by virtual CPUs. Such a management module is hereinafter referred to as a hypervisor.

Conventionally, an Operating System (OS) using a plurality of CPUs has, for each CPU, a task queue listing tasks. Each CPU executes the tasks listed in the task queue for that CPU. In order to utilize CPU resources efficiently, it is preferable to balance the load between CPUs. Technology has thus been developed for an OS to calculate the load on each CPU, based on factors such as the number of tasks listed in the task queue and the priority of the tasks, and balance the load by dividing up tasks. Specifically, when a new task is generated, the OS may for example list the task in the task queue for the CPU with the smallest load. Another method for dividing the load is for the OS to calculate the load on each CPU at regular intervals and moves tasks between CPUs to balance the load.

The hypervisor that schedules the virtual CPUs determines the order of execution of the virtual CPUs. Patent Literature 1 discloses technology for a virtual machine to notify the hypervisor of the priority of the next task to be executed when switching between tasks and for the hypervisor to determine which virtual machine will execute a task next based on the priority. With this technology, processing by a virtual machine executing a task with a high priority, such as a task that needs to be executed in real time (hereinafter, a "real-time task" (RT task)), is executed first, thus more easily satisfying the demands of real-time processing.

CITATION LIST

Patent Literature

Patent Literature 1: Japanese Patent Application Publication No. 2000-242512

SUMMARY OF INVENTION

With technology for virtual machines, two or more virtual CPUs may be allocated to one of a plurality of physical CPUs (processors). In this case, when the two or more virtual CPUs are running on different operating systems, each OS manages the plurality of task queues included therein to balance the processing load.

In some cases, however, among the physical CPUs to which the virtual CPUs are allocated, the processing load may become higher for one physical CPU than for another.

In such a case, the technology in Patent Literature 1 only serves to determine the order of execution between two virtual CPUs allocated to one physical CPU. This technology does not change the processing load on the physical CPU.

Therefore, overall processing cannot be considered efficient when an imbalance in the processing load among physical CPUs occurs.

In light of the above problem, it is an object of the present invention to provide an information processing system, a method, a program, and an integrated circuit that maintain balance in the processing load on a plurality of processors.

In order to achieve the above object, an aspect of the present invention is an information processing system comprising: a plurality of operating systems each configured to perform execution control on processing tasks by assigning each task to a task group and causing all tasks assigned to a same task group to be executed on a same processor; and a hypervisor configured to associate each of a plurality of processors with one or more task groups in the operating systems and to cause each operating system to perform the execution control so that all tasks assigned to a same task group are executed on the processor associated with the same task group, the hypervisor including: an acquisition unit configured to sequentially acquire load indicators each indicating a processing load of each task group in each operating system; and a re-association unit configured to refer to the processing loads indicated by each load indicator acquired by the acquisition unit and, when determining that the processing loads are not balanced between the processors, to re-associate the processors with the task groups.

With the above structure, the information processing system re-associates the processors with the task groups when the processing loads are not balanced between the processors. This information processing system thus maintains balance in the processing loads across a plurality of processors.

BRIEF DESCRIPTION OF DRAWINGS

FIG. 4A shows correspondence between physical CPUs 1a-1c and virtual CPUs 6a-6d before reallocation according to Embodiment 1, and FIG. 4B shows correspondence between physical CPUs 1a-1c and virtual CPUs 6a-6d after reallocation according to Embodiment 1.

FIG. 7A shows correspondence between physical CPUs 1a-1c and virtual CPUs 6a-6d before reallocation according to Modification 1, and FIG. 7B shows correspondence between physical CPUs 1a-1c and virtual CPUs 6a-6d after reallocation according to Modification 1.

FIG. 9A shows correspondence between physical CPUs 1a-1c and virtual CPUs 6a-6d before reallocation according to Modification 2, and FIG. 9B shows correspondence between physical CPUs 1a-1c and virtual CPUs 6a-6d after reallocation according to Modification 2.

FIG. 10 shows operations by the information processing system of Modification 2 for task generation and movement.

FIG. 11 shows the structure of an information processing system 1000a.

FIG. 12 shows the flow of interrupt processing by the information processing system 1000a.

FIG. 14A shows correspondence between physical CPUs 1a-1c and virtual CPUs 6a-6d before reallocation according to Embodiment 3, and FIG. 14B shows correspondence between physical CPUs 1a-1c and virtual CPUs 6a-6d after reallocation according to Embodiment 3.

FIG. 17 shows the structure of an information processing system 1000c.

DETAILED DESCRIPTION OF INVENTION

1. Embodiment 1

The following describes an information processing system 1000 as an embodiment of the present invention.

1.1 Structure

Figure 1:
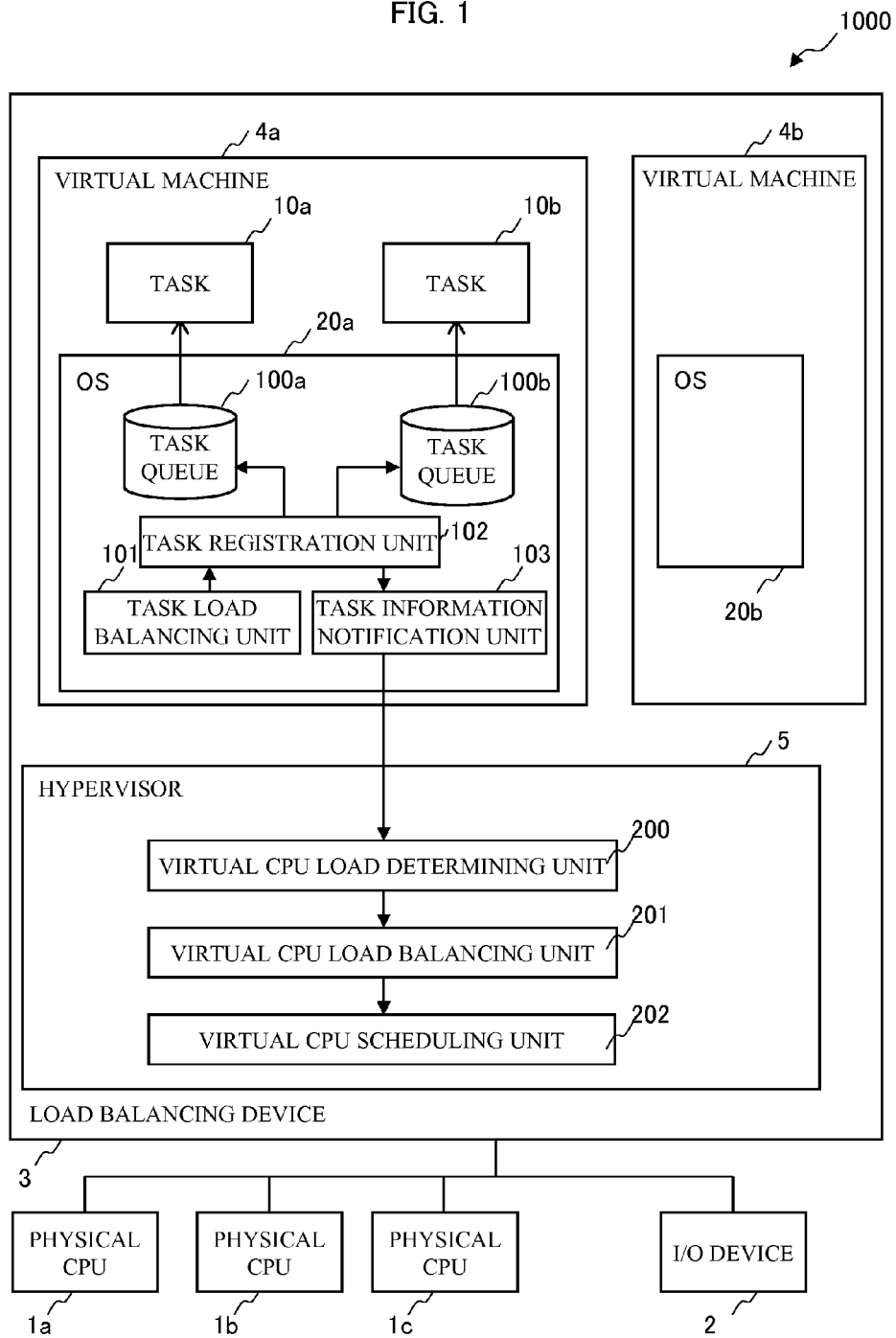
FIG. 1 shows the structure of an information processing system 1000.

FIG. 1 shows the structure of the information processing system 1000 according to the present embodiment. The information processing system 1000 includes a plurality of physical CPUs 1a, 1b, and 1c, an I/O device 2, and a load balancing device 3. The load balancing device 3 includes memory, such as a Random Access Memory (RAM) or flash memory, in which the load balancing device 3 stores data and a variety of executable programs.

(1) Load Balancing Device 3

The load balancing device 3 constructs a virtual machine for each of a plurality of operating systems and executes a plurality of tasks generated in each CPU on a corresponding physical CPU.

Specifically, as shown in FIG. 1, the load balancing device 3 is provided with multiple (in this case, two) operating systems OS 20a and 20b and a hypervisor 5.

(1-1) OS 20a, 20b

As shown in FIG. 1, the OS 20a constitutes a virtual machine 4a and is provided with task queues 100a and 100b, a task load balancing unit 101, a task registration unit 102, and a task information notification unit 103. The OS 20b constitutes a virtual machine 4b. While not shown in FIG. 1, the OS 20b has a similar structure to the OS 20a.

Since the OS 20a and the OS 20b have similar structures, the following describes the constituent elements of the OS 20a.

Task Queues 100a, 100b

The task queues 100a and 100b list tasks generated in the OS 20a. As described below, these task queues 100a and 100b constitute virtual CPUs.

Tasks 10a and 10b respectively generated in the task queues 100a and 100b are processing units within a regular information processing system 1000. The OS 20a normally operates using a plurality of CPUs, but in the present embodiment, the OS 20a runs as a virtual machine and therefore uses a plurality of virtual CPUs.

Task Load Balancing Unit 101

The task load balancing unit 101 determines the balance of real-time tasks and regular tasks that are generated. In this context, a real-time task refers to a task that requires real-time capability, i.e. the capability to complete execution by a deadline. Real-time tasks are executed before regular tasks by, for example, increasing the priority of real-time tasks. Hereinafter, real-time tasks are referred to as RT tasks, whereas tasks not requiring real-time capability are referred to as regular tasks. Tasks for which no distinction between RT tasks and regular tasks is required are simply referred to as tasks.

When a new task is generated, for example, the task load balancing unit 101 operates to determine which of the task queues 100a and 100b the new task should be registered in so as to balance the load.

Specifically, upon generation of a new task, the task load balancing unit 101 calculates the processing load of each of the task queues 100a and 100b by calculating the total sum of the priority of each task included therein. The task load balancing unit 101 selects the task queue with the smallest processing load, i.e. the task queue with the smallest total sum of priorities.

Task Registration Unit 102

The task registration unit 102 receives the selection of the task load balancing unit 101 and registers the newly generated task in the selected task queue.

Task Information Notification Unit 103

The task information notification unit 103 determines whether the newly generated task is a regular task or an RT task. When the newly generated task is an RT task, the task information notification unit 103 notifies the hypervisor 5 of the registration destination of the RT task. The task information notification unit 103 is called by the task registration unit 102 and is executed immediately on the physical CPU that executed the task registration unit 102.

(1-2) Hypervisor 5

The hypervisor 5 manages the allocation of virtual CPUs in the virtual machines 4a and 4b to physical CPUs and causes each OS to perform tasks.

The hypervisor 5 includes a virtual CPU load determining unit 200, a virtual CPU load balancing unit 201, and a virtual CPU scheduling unit 202.

Virtual CPU Load Determining Unit 200

The virtual CPU load determining unit 200 determines the load on each of the virtual CPUs 6a-6d.

Specifically, upon receiving notification from the task information notification unit 103 of registration of a newly generated RT task, the virtual CPU load determining unit 200 determines the current load status in each task queue. For example, the virtual CPU load determining unit 200 manages the processing load by determining whether each task queue includes an RT task. In this case, a high priority is associated with an RT task. Therefore, the virtual CPU load determining unit 200 can identify whether the task queue includes a task with a priority of at least a predetermined threshold, i.e. an RT task. A task queue that includes such a task has a high processing load, whereas a task queue that does not has a low processing load.

Virtual CPU Load Balancing Unit 201

The virtual CPU load balancing unit 201 determines a new allocation of task queues (virtual CPUs) in the virtual machines 4a and 4b to physical CPUs 1a, 1b, and 1c and implements the new allocation.

Specifically, based on the load status of each task queue as determined by the virtual CPU load determining unit 200, the virtual CPU load balancing unit 201 identifies the processing load on the physical CPUs 1a, 1b, and 1c.

When the processing loads identified for the physical CPUs are unbalanced, the virtual CPU load balancing unit 201 determines an allocation of task queues (virtual CPUs) to the physical CPUs 1a, 1b, and 1c that balances the processing loads. The virtual CPU load balancing unit 201 then implements the determined allocation.

Virtual CPU Scheduling Unit 202

The virtual CPU scheduling unit 202 determines the order of execution of the virtual CPUs allocated to the physical CPUs.

For example, when different virtual CPUs are allocated to one physical CPU, the virtual CPU scheduling unit 202 determines the processing order for execution of one virtual CPU by time sharing with other virtual CPUs. Specifically, when two virtual CPUs are allocated to one physical CPU, the virtual CPU scheduling unit 202 determines the processing order for execution of the two virtual CPUs by time sharing when switching between the context of one virtual CPU and the context of the other virtual CPU.

Each virtual CPU then sequentially executes the tasks contained therein by time sharing.

(2) Physical CPUs 1a, 1b, 1c

In the processing order scheduled by the virtual CPU scheduling unit 202, the physical CPUs 1a, 1b, and 1c each process the tasks registered in the one or more task queues allocated thereto by the hypervisor 5.

(3) I/O device 2

The I/O device 2 receives external instructions and notifies the physical CPUs 1a, 1b, and 1c, as well as the load balancing device 3, of the received instructions.

1.2 Examples of Allocation

The following describes examples of changing the allocation of task queues (virtual CPUs).

(1) Example 1

Example of Allocating a Generated Task to a Virtual CPU

Figure 2:
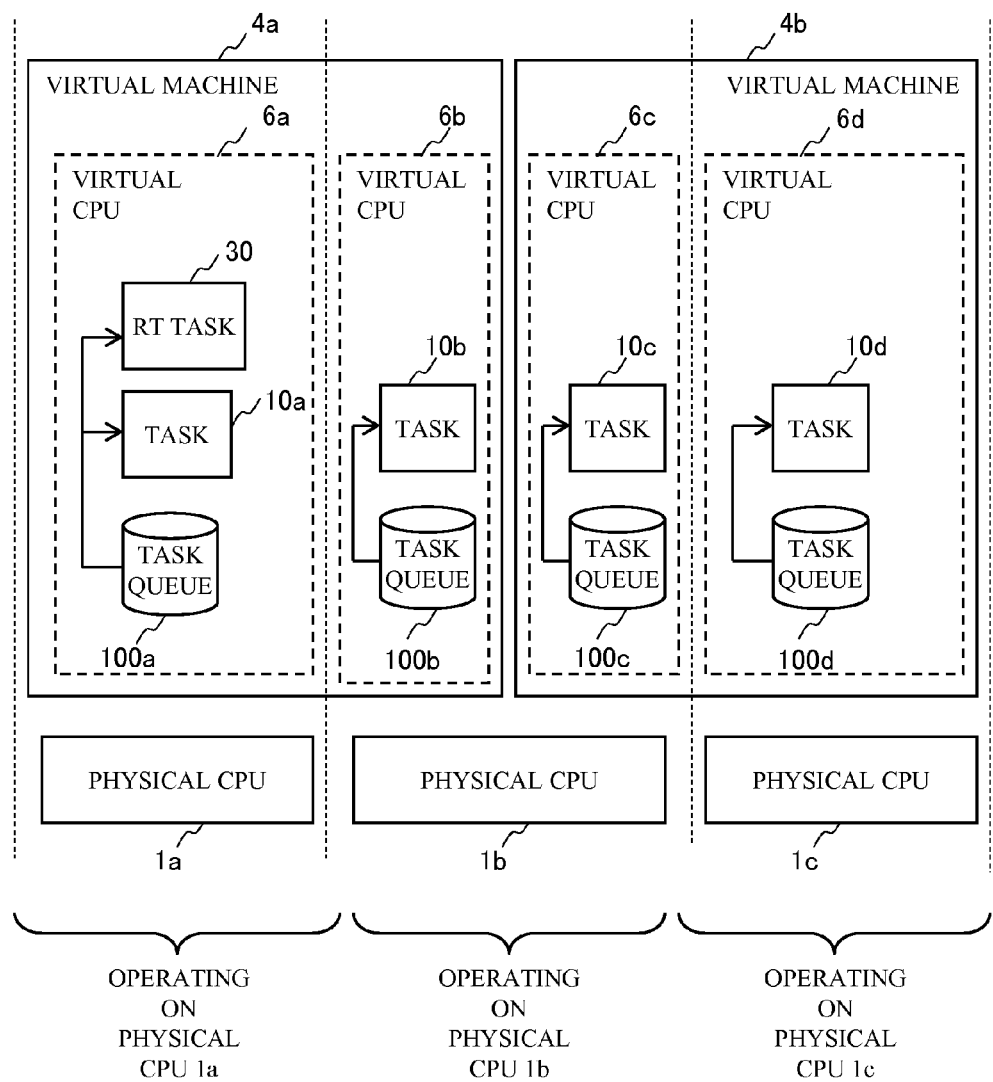
FIG. 2 shows correspondence between physical CPUs 1a-1c and virtual CPUs 6a-6d.

FIG. 2 shows an example of allocation. As shown in FIG. 2, in virtual machine 4a, the task queue 100a (virtual CPU 6a) is allocated to the physical CPU 1a, whereas the task queue 100b (virtual CPU 6b) is allocated to the physical CPU 1b. In the virtual machine 4b, the task queue 100c (virtual CPU 6c) is allocated to the physical CPU 1b, whereas the task queue 100d (virtual CPU 6d) is allocated to the physical CPU 1c. In other words, two task queues, 100b and 100c, are allocated to the physical CPU 1b. With task queues being allocated as in FIG. 2, an RT task 30 is generated in virtual CPU 6a.

Figure 3:
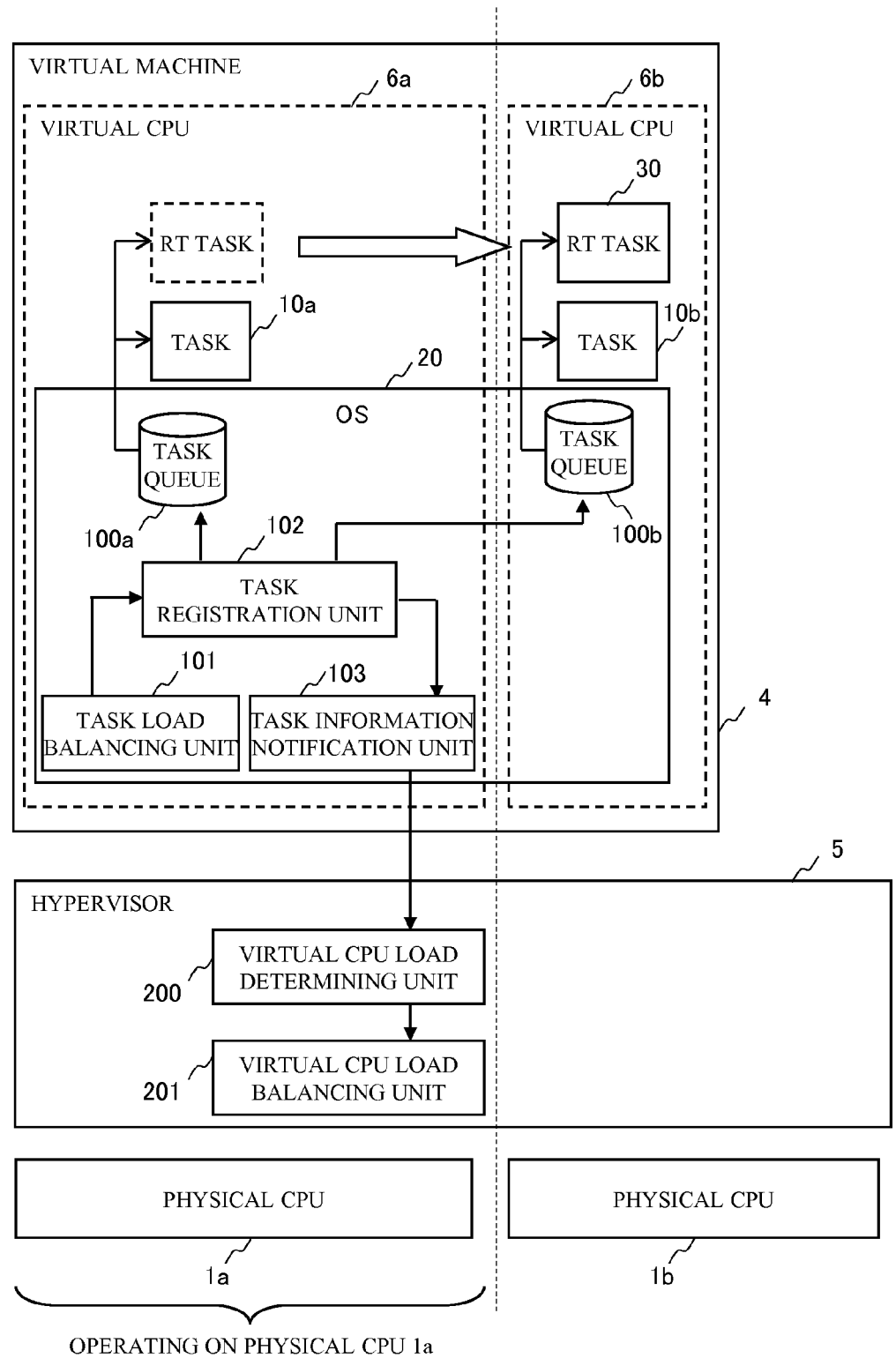
FIG. 3 illustrates movement of a newly generated task.

Based on the number of RT tasks in the task queues 100a and 100b, the task load balancing unit 101 determines where to register the new RT task 30 so that the processing loads for the task queues 100a and 100b are balanced. For example, suppose the task load balancing unit 101 determines to register the RT task in the task queue 100b. As shown in FIG. 3, the task registration unit 102 then moves the RT task 30 to the determined task queue, registering the RT task 30 in the task queue 100b (virtual CPU 6b).

The task information notification unit 103 notifies the hypervisor 5 that the RT task 30 has been registered in the task queue of the virtual CPU 6b. At this point, as described above, the task information notification unit 103 is called by the task registration unit 102 and is executed immediately on the CPU that executed the task registration unit 102 (in this example, the physical CPU 1a). It is also possible, for example, to notify the hypervisor 5 of registration of the RT task 30 upon a task switch in the virtual CPU 6b. When notifying at the time of a task switch, however, the notification occurs after the virtual CPU 6b is executed on the physical CPU 1b. In other words, a delay may occur in the hypervisor 5 being notified that the task registration unit 102 has registered the task queue 100b in the virtual CPU 6b. As a result, the requirements for execution of the RT task 30 may not be met. In order to avoid this problem, when the task registration unit 102 performs operations on a physical CPU in the present embodiment, notification of the hypervisor 5 is performed immediately on that physical CPU.

Upon receiving notification from the task information notification unit 103 of registration of a newly generated RT task, the virtual CPU load determining unit 200 determines the current load status in each task queue. The virtual CPU load balancing unit 201 determines the allocation of the virtual CPUs 6a-6d to the physical CPUs 1a-1c and then implements the allocation. Note that at this point, the virtual CPU load determining unit 200 and the virtual CPU load balancing unit 201, like the task information notification unit 103, are executed immediately on the CPU that executed the task registration unit 102 (in this example, the physical CPU 1a).

Upon the virtual CPU load balancing unit 201 determining and implementing the allocation of the virtual CPUs 6a-6d to the physical CPUs 1a-1c, the virtual CPU scheduling unit 202 shown in FIG. 1 determines the order of execution of the virtual CPUs allocated to the physical CPUs. This ordering is not shown in the figures.

FIG. 4A shows an example of the virtual CPUs 6a-6d (task queues 100a-100d) when the RT task 30 moves from the virtual CPU 6a (task queue 100a) to the virtual CPU 6b (task queue 100b).

Example of Reallocation of Virtual CPUs to Physical CPUs

In FIG. 4A, two virtual CPUs, 6b and 6c, are allocated to the physical CPU 1b. An RT task 30 is registered in the virtual CPU 6b, and an RT task 30c is registered in the virtual CPU 6c. In the other virtual CPUs, 6a and 6d, no RT task is registered. In this case, an unbalanced number of RT tasks are registered in the physical CPU 1b. Therefore, the virtual CPU load balancing unit 201 determines an allocation of task queues (virtual CPUs) to the physical CPUs 1a, 1b, and 1c that balances the number of RT tasks. The virtual CPU load balancing unit 201 then implements the determined allocation. FIG. 4B shows an example of the result of reallocation, in which the virtual CPU 6b is allocated to a different physical CPU. The imbalance in RT tasks is thus corrected by distributing, between the physical CPU 1a and the physical CPU 1b, task queues in which RT tasks are registered (virtual CPU 6b, virtual CPU 6c). As a result, each physical CPU has at most one virtual CPU with an RT task 30.

After task queues (virtual CPUs) are reallocated to the physical CPUs 1a-1c, the virtual CPU scheduling unit 202 determines the order of execution of the virtual CPUs 6a-6d allocated to the physical CPUs 1a-1c. In FIGS. 4A and 4B, for example, the virtual CPU scheduling unit 202 prioritizes a virtual CPU that includes an RT task 30. When both a virtual CPU that includes an RT task 30 and a virtual CPU that does not are allocated to the same physical CPU (in this case, physical CPU 1b), the virtual CPU scheduling unit 202 for example first executes the virtual CPU 6c that includes the RT task 30c. When the task for this virtual CPU is complete, i.e. when the virtual CPU becomes idle, the virtual CPU scheduling unit 202 switches to the virtual CPU 6a, which does not include an RT task.

1.3 Operations

The following describes operations of the information processing system 1000.

(1) Overview

Figure 5:
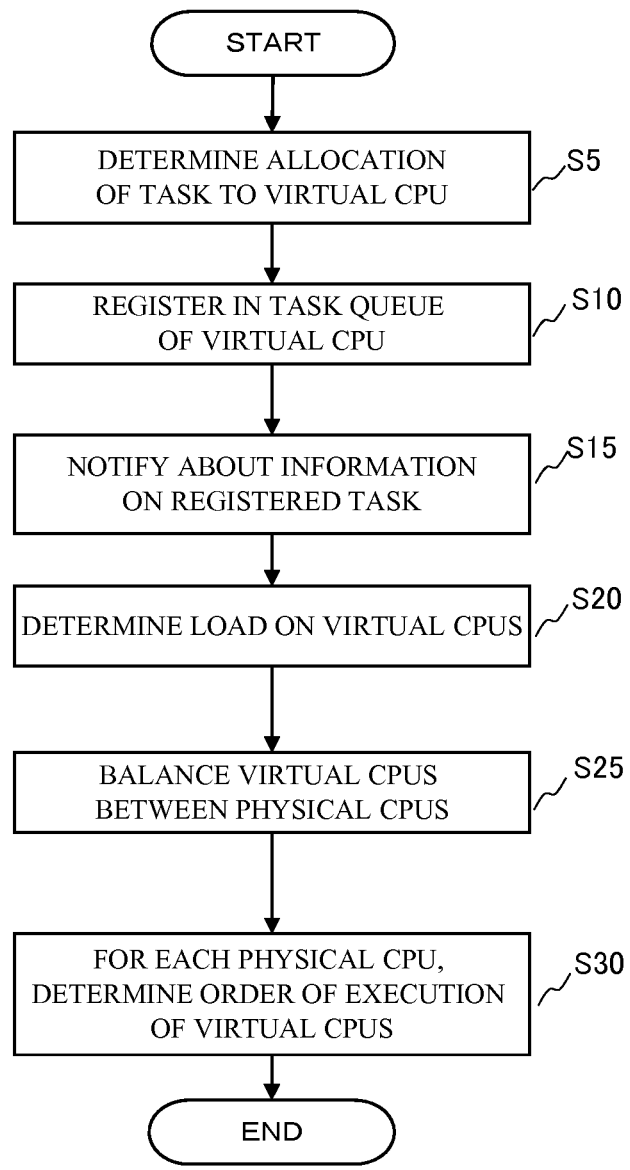
FIG. 5 outlines the flow of processing by the information processing system 1000.

First, an overview of processing is provided with reference to the flowchart in FIG. 5.

The task load balancing unit 101 determines the allocation of a newly generated task to a virtual CPU (step S5). The task registration unit 102 registers the newly generated task in the task queue of the virtual CPU determined by the task load balancing unit 101 (step S10). The task information notification unit 103 immediately notifies the hypervisor 5 of information on the task registered in the task queue (step S15).

Upon receiving notification from the task information notification unit 103, the virtual CPU load determining unit 200 in the hypervisor 5 determines the load on each of the virtual CPUs (step S20). Based on the load determined by the virtual CPU load determining unit 200, the virtual CPU load balancing unit 201 balances the virtual CPUs between the physical CPUs 1a-1c (step S25). The virtual CPU scheduling unit 202 determines the order of execution of the virtual CPUs allocated to each of the physical CPUs 1a-1c (step S30). In accordance with the determined order of execution, each physical CPU then executes the tasks included in the one or more virtual CPUs allocated thereto.

(2) Details on Processing

Details on the processing shown in FIG. 5 are now described in detail with reference to the flowchart in FIG. 6. Note that it is assumed here that a new RT task has been generated in the virtual machine 4a.

Upon generation of a new task, the task load balancing unit 101 calculates the processing load of the virtual CPUs 6a and 6b by calculating the total sum of the priority of every task in the respective task queues 100a and 100b. The task load balancing unit 101 then identifies the virtual CPU with the smallest processing load in the OS in which the new task was generated (step S100).

The task registration unit 102 registers the newly generated task in the task queue of the virtual CPU that has been identified (step S105).

The task information notification unit 103 determines whether the registered task is an RT task (step S110).

When determining the registered task to be an RT task (step S110: Yes), the task information notification unit 103 notifies the virtual CPU load determining unit 200 in the hypervisor 5 of the newly registered RT task (step S115).

Upon receiving notification from the task information notification unit 103, the virtual CPU load determining unit 200 determines the current load status in each task queue (step S120).

Based on the load status of each task queue as determined by the virtual CPU load determining unit 200, the virtual CPU load balancing unit 201 identifies the processing load on the physical CPUs 1a-1c. Based on the processing load determined for each of the physical CPUs 1a-1c, the virtual CPU load balancing unit 201 determines the allocation of the virtual CPUs 6a-6d to the physical CPUs 1a-1c. Specifically, the virtual CPU load determining unit 200 determines whether, among a plurality of virtual CPUs including an RT task, any virtual CPUs are allocated to the same physical CPU (step S125).

When determining that virtual CPUs including an RT task are allocated to the same physical CPU (step S125: Yes), the virtual CPU load determining unit 200 searches for a physical CPU to which no virtual CPU including an RT task is allocated (step S130). Upon finding a physical CPU to which a virtual CPU that does not include an RT task is allocated (step S135: Yes), the virtual CPU load determining unit 200 identifies the physical CPU as having a low processing load (step S140).

The virtual CPU load balancing unit 201 switches the virtual CPU in which the new RT task is registered with the virtual CPU that does not include an RT task and is allocated to the physical CPU identified as having a low processing load (step S145).

Processing ends in the following cases: when determining that the task registered in the virtual CPU is not an RT task (step S110: No), when determining that no virtual CPUs including an RT task are allocated to the same physical CPU (step S125: No), or when not finding a physical CPU when searching in step S130 (step S135: No).

After the above processing finishes, the virtual CPU scheduling unit 202 determines the order of execution of the virtual CPUs allocated to each of the physical CPUs 1a-1c.

1.4. Modifications to Embodiment 1

(1) Modification 1

The difference between Modification 1 and Embodiment 1 is the method of allocation by the virtual CPU load balancing unit. In the following description, the same reference signs are used for similar constituent elements as in Embodiment 1.

A virtual task load balancing unit in Modification 1 identifies the current load status in each physical CPU 1a-1c based on the load status for each task queue as identified by the virtual CPU load determining unit 200.

The following describes this function in detail.

The virtual task load balancing unit determines whether another virtual CPU is also allocated to the physical CPU (referred to here as "first physical CPU") to which a virtual CPU (task queue) including an RT task is allocated.

Upon determining that another virtual CPU is also allocated, the virtual task load balancing unit determines whether there is any physical CPU (referred to here as "second physical CPU") to which no virtual CPU including an RT task is allocated. If so, the virtual task load balancing unit determines the second physical CPU to have a low processing load and reallocates, to the second physical CPU, the other virtual CPU allocated to the first physical CPU.

(2) Example

The following describes an example of a method of allocation to apply the function of the above-described virtual task load balancing unit.

FIG. 7A shows an example of the virtual CPUs 6a-6d (task queues 100a-100d) when the RT task 30 shown in FIG. 3 moves from the virtual CPU 6a (task queue 100a) to the virtual CPU 6b (task queue 100b).

In FIG. 7A, two virtual CPUs, 6b and 6c, are allocated to the physical CPU 1b. An RT task 30 is registered in the virtual CPU 6b, whereas no RT task is registered in the virtual CPU 6c. An RT task 30a is registered in the virtual CPU 6a, whereas no RT task is registered in the virtual CPU 6d. In this case, the virtual CPU 6b, which includes an RT task, and the virtual CPU 6c, which does not, are both allocated to the same physical CPU 1b. Therefore, the virtual CPU load balancing unit 201 determines that the processing load is unbalanced and, in order to restore balance, determines a new allocation so that no other virtual CPU is allocated to the physical CPU 1b, to which the virtual CPU 6b that includes the RT task 30 is allocated. The virtual CPU load balancing unit 201 then implements the determined allocation. FIG. 7B shows an example of the result of reallocation, in which the virtual CPU 6c is allocated to a different physical CPU. In this example, the RT task 30 is moved to the virtual CPU 6b. Therefore, the virtual CPU 6c is allocated to the physical CPU 1c.

By not allocating any other virtual CPUs to a physical CPU to which a virtual CPU that includes an RT task is allocated, no competition occurs for the virtual CPU that includes the RT task. Therefore, the virtual CPU scheduling unit 202 need not perform any particular operations.

(3) Operations

Figure 8:
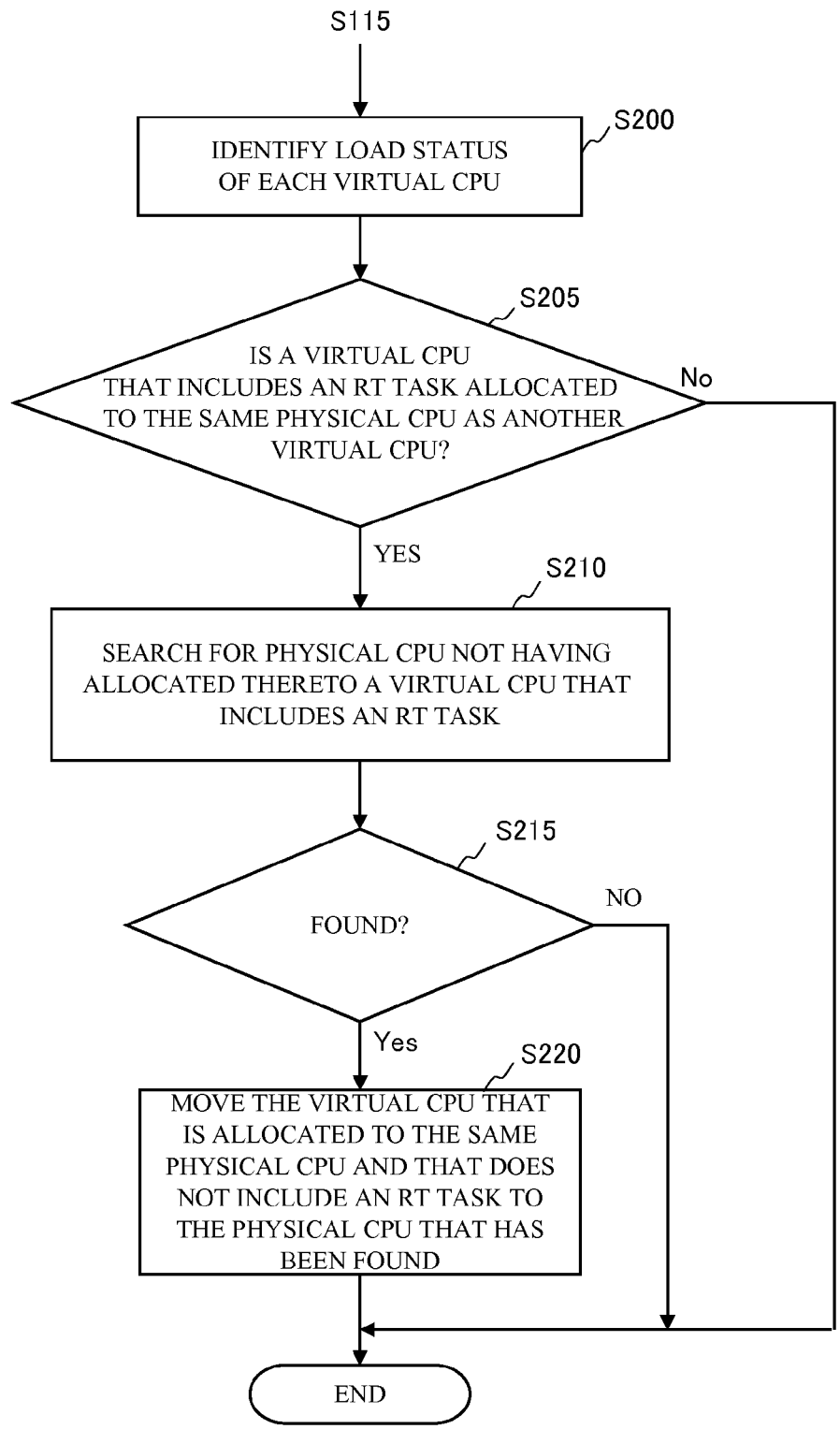
FIG. 8 shows operations by the information processing system of Modification 1 for task generation and movement.

Operations by the information processing system according to Modification 1 are now described with reference to the flowchart in FIG. 8, focusing on the differences with Embodiment 1.

Figure 6:
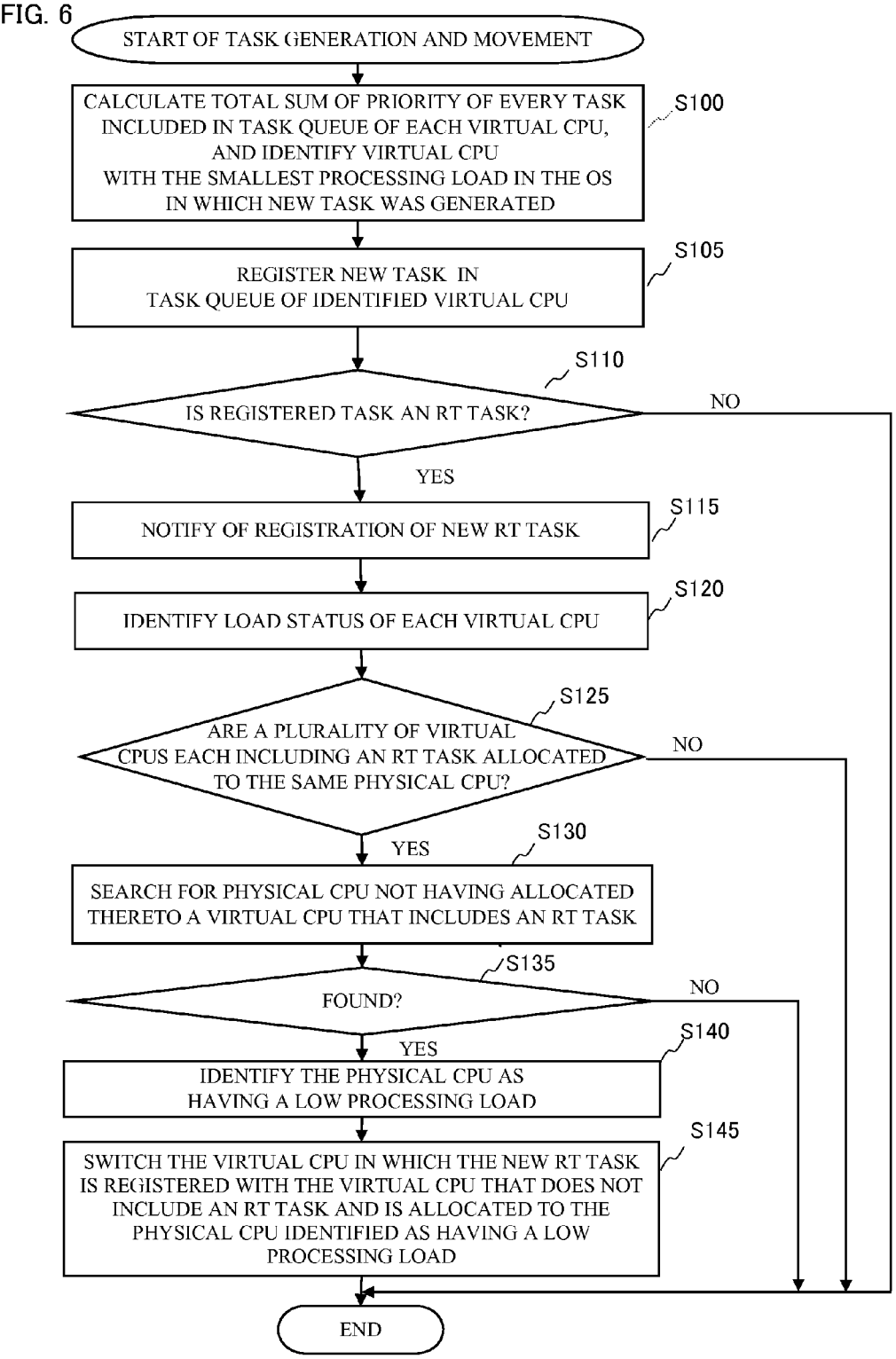
FIG. 6 shows details on processing by the information processing system 1000 (task generation and movement).

First, the information processing system according to Modification 1 performs the processing from step S100 through step S115 shown in FIG. 6. Since this processing has already been described, further description is omitted here.

After completion of step S115, the virtual CPU load determining unit 200 identifies the current load status in each task queue upon receiving notification from the task information notification unit 103 (step S200).

The virtual task load balancing unit determines whether a virtual CPU that includes an RT task is allocated to the same physical CPU as another virtual CPU (step S205). Specifically, the virtual task load balancing unit determines whether another virtual CPU is also allocated to a first physical CPU, to which the virtual CPU including the RT task is allocated.

When the virtual task load balancing unit determines positively (step S205: Yes), the virtual CPU load balancing unit searches for a physical CPU to which no virtual CPU including an RT task is allocated (step S210).

When finding a physical CPU to which no virtual CPU that includes an RT task is allocated (step S215: Yes), the virtual CPU load balancing unit identifies the physical CPU (second physical CPU) as having a low processing load. The virtual CPU load balancing unit then reallocates, to the second physical CPU, the virtual CPU allocated to the first physical CPU (step S220).

When a negative determination is made in step S205 (step S205: No), or during the search in step S210, when a virtual CPU that includes an RT task is allocated to every physical CPU (step S215: No), processing ends.

After the above processing finishes, the virtual CPU scheduling unit 202 determines the order of execution of the virtual CPUs allocated to each of the physical CPUs 1a-1c.

(2) Modification 2

The difference between Modification 1 and Embodiment 1 is the method of allocation by the virtual task load balancing unit. In the following description, the same reference signs are used for similar constituent elements as in Embodiment 1.

In Modification 2, a predetermined load value indicating task load is assigned to both a regular task and an RT task.

Specifically, the virtual CPU load determining unit according to the present modification determines the status of the processing load of a virtual CPU to be the total of the load value of each task in the corresponding one of the task queues 100a and 100b.

The virtual CPU load balancing unit according to the present modification balances (allocates) the virtual CPUs 6a-6d so that the total of the load values of the virtual CPUs allocated to each of the physical CPUs 1a-1c is even.

(2) Example

The following describes an example of a method of allocation to apply the function of the virtual CPU load balancing unit in the present modification.

FIG. 9A shows an example of the virtual CPUs 6a-6d (task queues 100a-100d) when the RT task 30 shown in FIG. 3 moves from the virtual CPU 6a (task queue 100a) to the virtual CPU 6b (task queue 100b). In this example, a value of one is assigned as the load value for a regular task, whereas a value of ten is assigned as the load value for an RT task.

In FIG. 9A, two virtual CPUs, 6b and 6c, are assigned to the physical CPU 1b. An RT task 30 and a regular task 10b are registered in the virtual CPU 6b, and an RT task 30c and a regular task 10c are registered in the virtual CPU 6c. A regular task 10a is registered in the virtual CPU 6a, whereas an RT task 30d and a regular task 10d are registered in the virtual CPU 6d. In this case, due to movement of the RT task 30, the total load value for the virtual CPU 6a decreases from 11 to 1. On the other hand, the total load value for the virtual CPU 6b increases from 12 to 22.

As a result, the total load value for the virtual CPUs 6b and 6c, which are allocated to the physical CPU 1b, becomes 22. This is a high value compared to the other physical CPUs 1a and 1c. The virtual CPU load balancing unit 201 thus determines that an unbalanced processing load is placed on the physical CPU 1b and, in order to restore balance, determines a new allocation so that the total load values are even. The virtual CPU load balancing unit 201 then implements the determined allocation. FIG. 9B shows an example of the result of reallocation, in which the virtual CPU 6b is allocated to a different physical CPU. In this example, the virtual CPU 6b is reallocated to the physical CPU 1a. After reallocation, the total load values for the physical CPUs 1a-1c are 12, 11, and 11, which are nearly even.

This avoids virtual CPUs that include an RT task from being concentrated on one physical CPU. Note that in general, tasks with a high priority are real-time tasks. Therefore, the load for a task may be determined based on the task's priority.

(3) Operations

Operations by the information processing system according to Modification 2 are now described with reference to the flowchart in FIG. 10. Note that it is assumed here that a new task has been generated in the virtual machine 4a.

Upon generation of a new task, the task load balancing unit 101 calculates the processing load of each of the task queues 100a and 100b respectively in the virtual CPUs 6a and 6b by calculating the total sum of the priority of each task included therein. The task load balancing unit 101 then identifies the virtual CPU with the smallest processing load in the OS in which the new task was generated (step S300).

The task registration unit 102 registers the newly generated task in the task queue of the virtual CPU that has been identified (step S305).

The task information notification unit 103 notifies the virtual CPU load determining unit according to the present modification of the load value for the new registered task (step S310).

The virtual CPU load determining unit according to the present modification calculates the total load value for each of the virtual CPUs 6a-6d (step S315).

The virtual CPU load balancing unit according to the present modification identifies the load status for each of the physical CPUs 1a-1c based on the total load value calculated for the virtual CPUs (step S320).

The virtual CPU load balancing unit according to the present modification then calculates the load that would be placed on the physical CPU currently having the smallest load if the virtual CPU in which the new task was registered is moved thereto (step S325).

The virtual CPU load balancing unit according to the present modification determines whether the calculation in step S325 results in a more even load on the physical CPUs 1a-1c than before calculation (step S330).

When it is determined that the load is more even (step S330: Yes), the virtual CPU load balancing unit according to the present modification moves the virtual CPU in which the new task was registered to the physical CPU having the smallest load (step S335).

If it is determined that the load is not more even (step S330: No), processing ends.

After the above processing is complete, the virtual CPU scheduling unit 202 determines the order of execution of the virtual CPUs allocated to each of the physical CPUs 1a-1c.

1.5 Summary of Embodiment 1

As described above, when an RT task is generated in a virtual CPU, the information processing system 1000 according to the present embodiment reallocates the virtual CPUs to physical CPUs so that RT tasks do not coincide on the same physical CPU. Thus balancing the load of virtual CPUs between physical CPUs avoids competition between RT tasks and allows for the requirements for execution of RT tasks to be met.

2. Embodiment 2

The following describes Embodiment 2, focusing on the differences from Embodiment 1. Note that constituent elements that are the same as in Embodiment 1 are indicated by the same reference signs.

Figure 11:
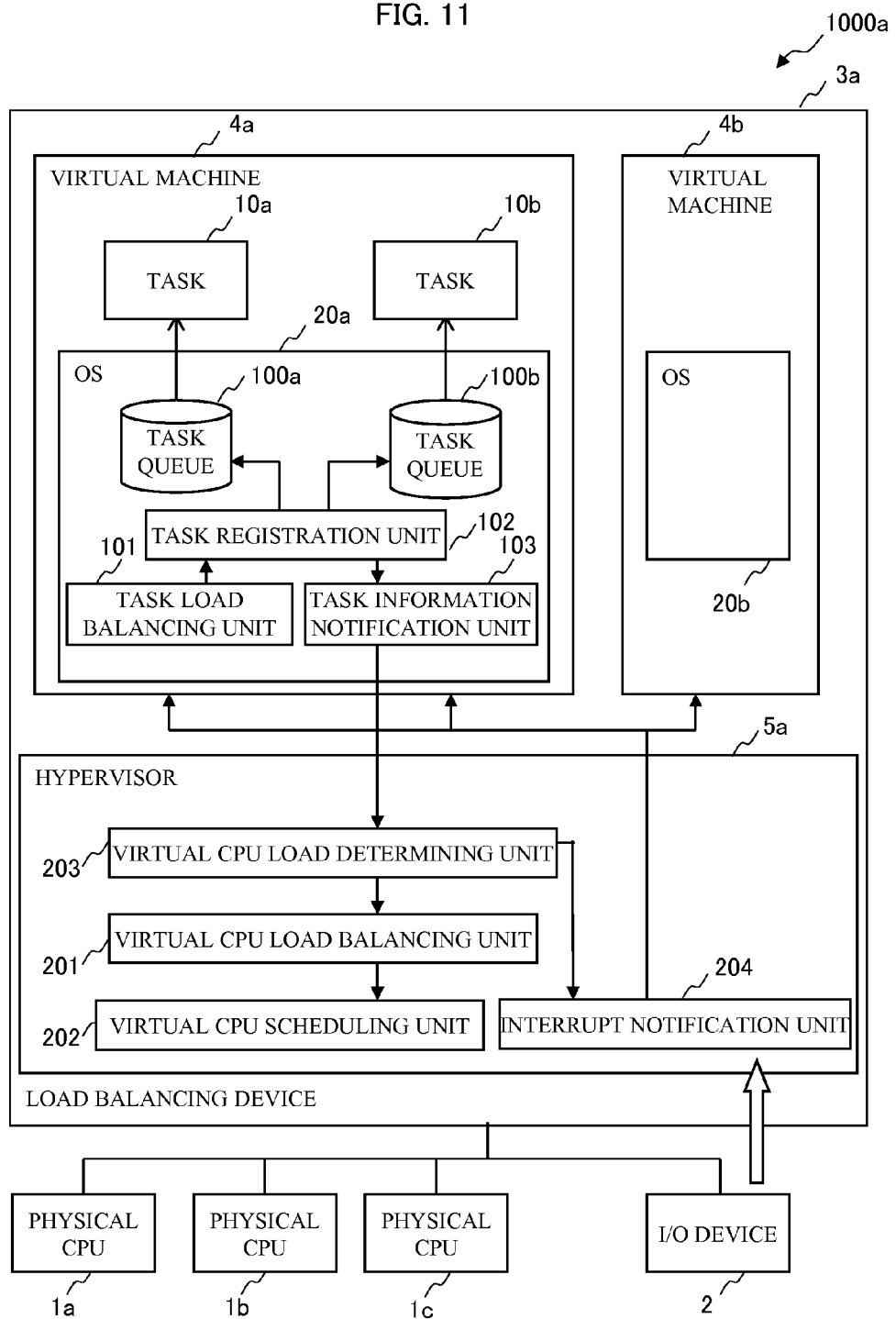

FIG. 11 shows the structure of an information processing system 1000a according to Embodiment 2. In addition to the components of the information processing system 1000 shown in FIG. 1, the information processing system 1000a in FIG. 11 includes an interrupt notification unit 204. Furthermore, the virtual CPU load determining unit 200 of the information processing system 1000 is replaced by a virtual CPU load determining unit 203.

2.1 Structure

The following describes the virtual CPU load determining unit 203 and the interrupt notification unit 204.

(1) Virtual CPU Load Determining Unit 203

In addition to having similar functions to the virtual CPU load determining unit 200 in Embodiment 1, the virtual CPU load determining unit 203 includes the following functions.

When the interrupt notification unit 204 receives an interrupt, the virtual CPU load determining unit 203 determines whether an interrupt notification should be issued to the virtual CPU that is the target of the interrupt. When determining that an interrupt notification should be issued, the virtual CPU load determining unit 203 notifies the interrupt notification unit 204 accordingly (via an interrupt notification instruction).

The operation for determining whether an interrupt notification should be issued is described below. The interrupt notification unit 204 is notified of the result of determination.

(2) Interrupt Notification Unit 204

Upon receiving an interrupt from the I/O device 2, the interrupt notification unit 204 identifies the virtual CPU that is the target of the interrupt. Upon receiving an interrupt notification instruction for the identified virtual CPU from the virtual CPU load determining unit 203, the interrupt notification unit 204 immediately provides notification of the interrupt.

In this context, immediately providing the interrupt notification means that issuing of the interrupt notification is prioritized over other interrupt notifications, so that even during a state of waiting for another interrupt notification to be issued (an interrupt related to a task other than a real-time task), a state of waiting for an interrupt related to a real-time task is not entered.

With conventional virtual machine technology, an interrupt notification can be delayed. Therefore, when the targeted virtual CPU is not being executed, for example, the virtual machine may be notified after waiting for execution. For example, a task may be placed in a suspended status that temporarily suspends operations, and the task in a suspended status may be executed again upon an interrupt.

Accordingly, the interrupt notification for a virtual CPU that includes an RT task may be triggered by restarting of the RT task. Therefore, the interrupt notification unit 204 allows for immediate restarting of an RT task by immediately providing interrupt notification. Furthermore, when a virtual CPU that includes an RT task is executed on the same physical CPU as another virtual CPU and immediately notifies the other virtual CPU of an interrupt, execution of the virtual CPU that includes the RT task may be suspended. In this sort of case, interrupt notification provided to another virtual CPU allocated to the same physical CPU may be delayed until the physical CPU that includes the RT task becomes idle.

2.2 Operations

Operations related to allocation of virtual CPUs are performed by similar operations as those shown in FIGS. 5 and 6 of Embodiment 1. A description thereof is thus omitted here.

Figure 12:
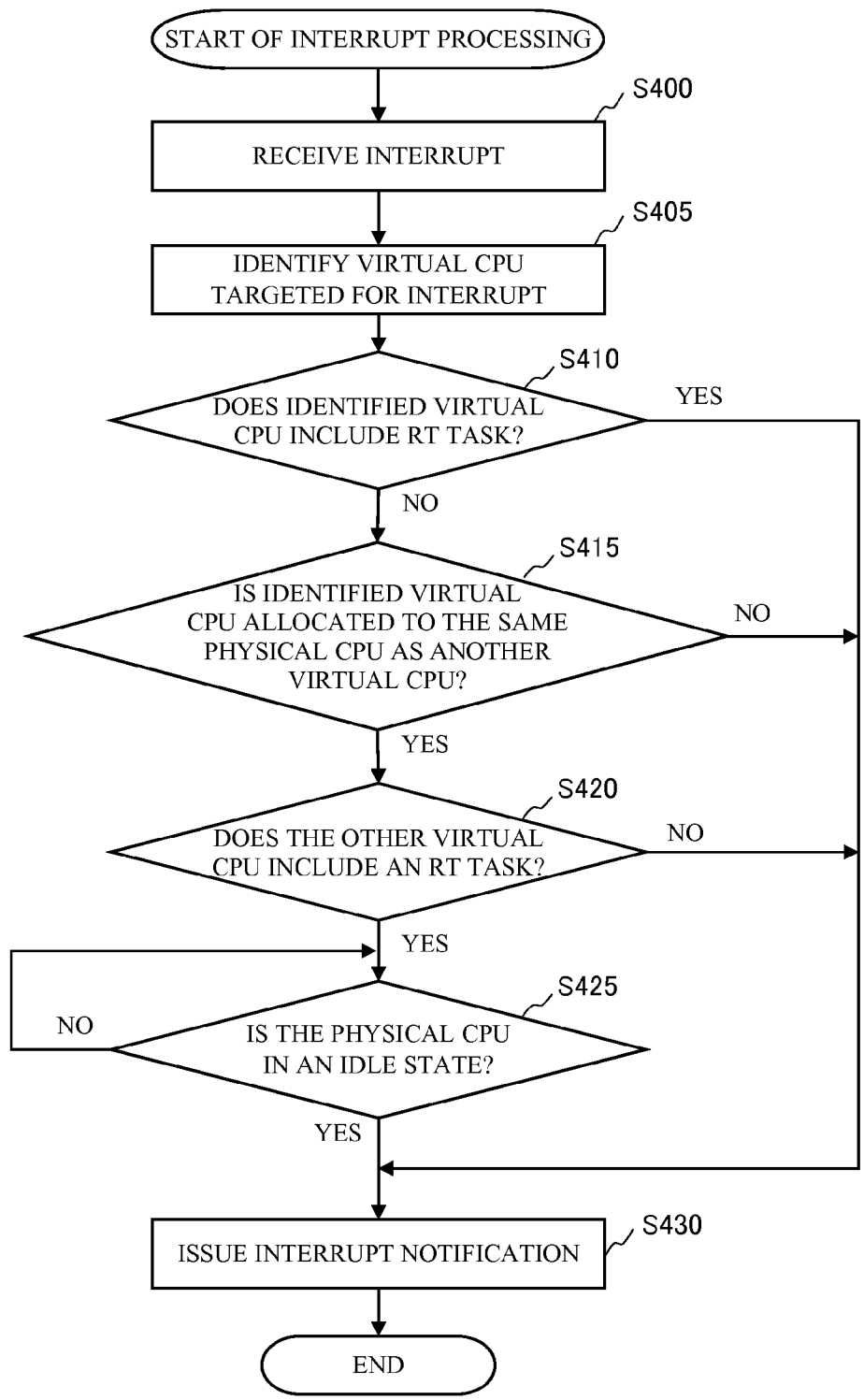

With reference to the flowchart shown in FIG. 12, the following describes operations when an interrupt notification occurs.

The interrupt notification unit 204 receives an interrupt from the I/O device 2 (step S400).

The interrupt notification unit 204 identifies the virtual CPU that is the target of the received interrupt (step S405).

The virtual CPU load determining unit 203 determines whether the virtual CPU identified by the interrupt notification unit 204 includes an RT task (step S410).

When the identified virtual CPU includes an RT task (step S410: Yes), the virtual CPU load determining unit 203 transmits an interrupt notification instruction to the interrupt notification unit 204. Upon receiving the interrupt notification instruction, the interrupt notification unit 204 immediately issues an interrupt notification to the identified virtual CPU (step S430).

When determining that the identified virtual CPU does not include an RT task (step S410: No), the virtual CPU load determining unit 203 further determines whether the identified virtual CPU is allocated to the same physical CPU as another virtual CPU (step S415).

When determining that the virtual CPU is allocated to the same physical CPU as another virtual CPU (step S415: Yes), the virtual CPU load determining unit 203 determines whether the other virtual CPU includes an RT task (step S420).

When determining that the other virtual CPU includes an RT task (step S420: Yes), the virtual CPU load determining unit 203 determines whether the physical CPU is in an idle state (step S425).

When the physical CPU is in an idle state (step S425: Yes), the virtual CPU load determining unit 203 transmits an interrupt notification instruction to the interrupt notification unit 204. Upon receiving the interrupt notification instruction, the interrupt notification unit 204 issues an interrupt notification to the identified virtual CPU (step S430).

The virtual CPU load determining unit 203 also transmits an interrupt notification instruction to the interrupt notification unit 204 in the following cases: when the identified virtual CPU is not allocated to the same physical CPU as another virtual CPU (step S415: No), or when the identified virtual CPU is allocated to the same physical CPU as another virtual CPU, yet the other virtual CPU does not include an RT task (step S420: No). Upon receiving the interrupt notification instruction, the interrupt notification unit 204 immediately issues an interrupt notification to the identified virtual CPU (step S430).

3. Embodiment 3

The following describes Embodiment 3, focusing on the differences from Embodiment 1. Note that constituent elements that are the same as in Embodiment 1 are indicated by the same reference signs.

Figure 13:
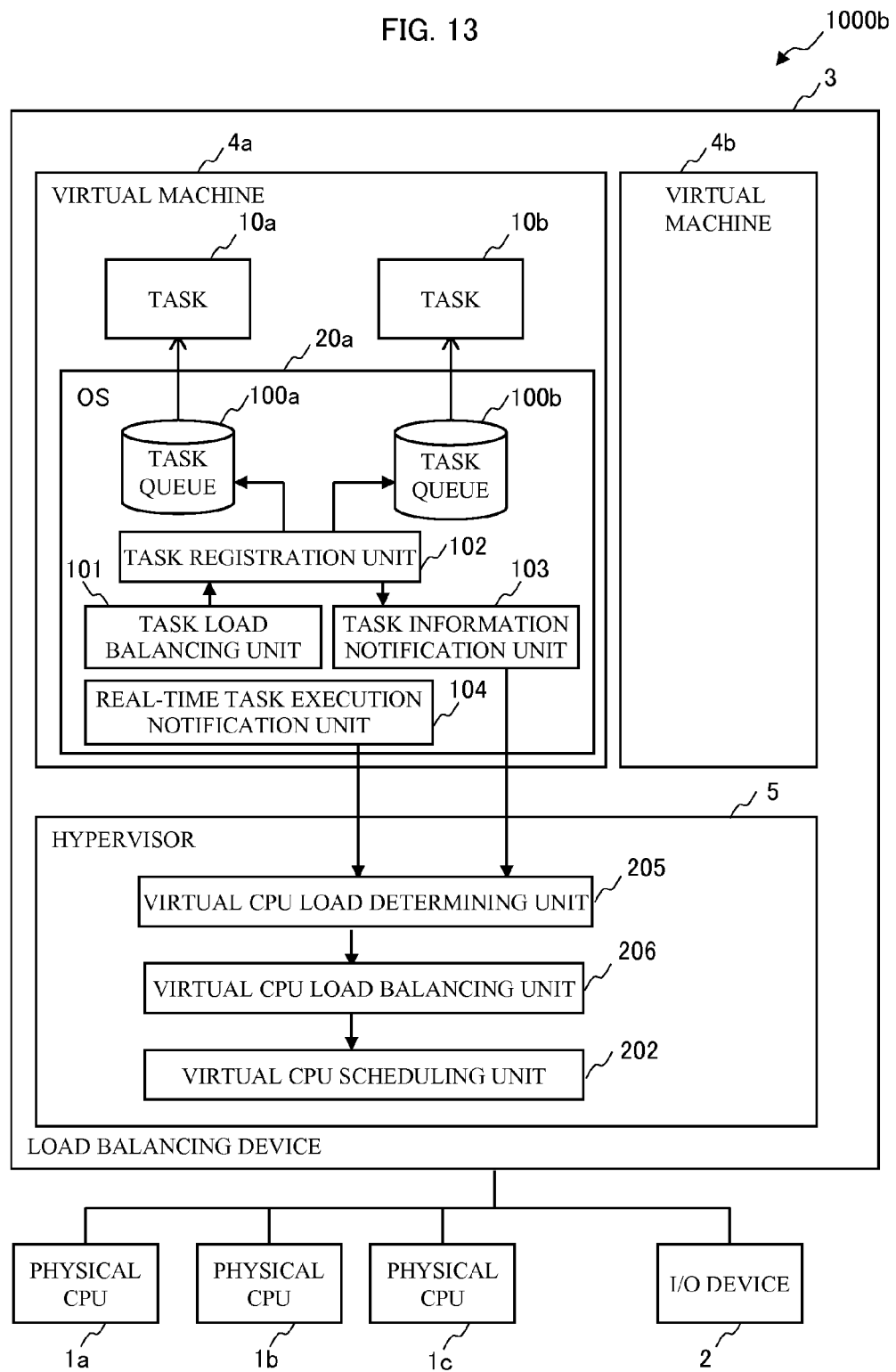
FIG. 13 shows the structure of an information processing system 1000b.

FIG. 13 shows the structure of an information processing system 1000b according to Embodiment 3. In addition to the components of the information processing system 1000 shown in FIG. 1, the information processing system 1000b in FIG. 13 includes a real-time task execution notification unit 104. Furthermore, the virtual CPU load determining unit 200 and the virtual CPU load balancing unit 201 of the information processing system 1000 are respectively replaced by a virtual CPU load determining unit 205 and a virtual CPU load balancing unit 206.

3.1 Structure

The following describes the functions of the real-time task execution notification unit 104, the virtual CPU load determining unit 205, and the virtual CPU load balancing unit 206.

(1) Real-Time Task Execution Notification Unit 104

The real-time task execution notification unit 104 notifies the virtual CPU load determining unit 205 of time information indicating the time at which operations for an RT task began.

This time information on an RT task is, for example, acquired from a task scheduler (not shown in the figures) in the OS 20a.

(2) Virtual CPU Load Determining Unit 205

Upon receiving the time information on an RT task, the virtual CPU load determining unit 205 calculates the operating cycle (activation cycle) of the RT task based on the time information that was just received and time information previously received. The virtual CPU load determining unit 205 then records the calculated operating cycle as the load of the virtual CPU that includes the RT task.

(3) Virtual CPU Load Balancing Unit 206

In addition to the functions of the virtual CPU load balancing unit 201 in Embodiment 1, the virtual CPU load balancing unit 206 is provided with the following functions.

When reallocating virtual CPUs, if the virtual CPU load balancing unit 206 determines that every physical CPU has allocated thereto a virtual CPU that includes an RT task, the virtual CPU load balancing unit 206 allocates a virtual CPU that includes a newly generated RT task to the physical CPU to which is allocated the virtual CPU including the RT task with the longest operating cycle.

3.2 Example of Allocation

The following is an example of balancing the virtual CPUs according to the present embodiment.

FIG. 14A shows the state before reallocation. Specifically, two virtual CPUs, 6b and 6c, are allocated to the physical CPU 1b. A newly generated RT task 40 is registered in the virtual CPU 6b, and an RT task 30c is registered in the virtual CPU 6c. RT tasks 30a and 30d are respectively registered in the other virtual CPUs, 6a and 6d. In this case, since an RT task is included in every virtual CPU, the virtual CPU load balancing unit 201 cannot reallocate the virtual CPUs so that at most one RT task is allocated to each of the physical CPUs 1a-1c. The virtual CPU load balancing unit 206 therefore identifies the virtual CPU including the RT task with the longest operating cycle, as well as the physical CPU to which this virtual CPU is allocated. The virtual CPU load balancing unit 206 then allocates the virtual CPU 6b that includes the newly generated RT task 40 to the identified physical CPU.

FIG. 14B shows an example of the result of reallocation. In this example, the virtual CPU 6a has the longest operating cycle and is allocated to the physical CPU 1a. Therefore, the virtual CPU 6b is reallocated from the physical CPU 1b to the physical CPU 1a.

By reallocating virtual CPUs in this way, the probability of competition between the new RT task and the RT task with the longest operating cycle is low. Accordingly, the probability of the RT task 30a in the virtual CPU 6a and the RT task 40 in the virtual CPU 6b simultaneously attempting to operate is low, thereby making it easier to satisfy the demands of real-time processing. If the number of virtual CPUs that include an RT task increases further, reallocation may be determined by considering the operating cycle of each physical CPU to be the shortest operating cycle of any real task included in any of the virtual CPUs 6a-6d that are allocated to the physical CPU.

3.3 Operations

The following describes operations of the information processing system 1000b according to Embodiment 3.

(1) Operating Cycle Updating

Figure 15:
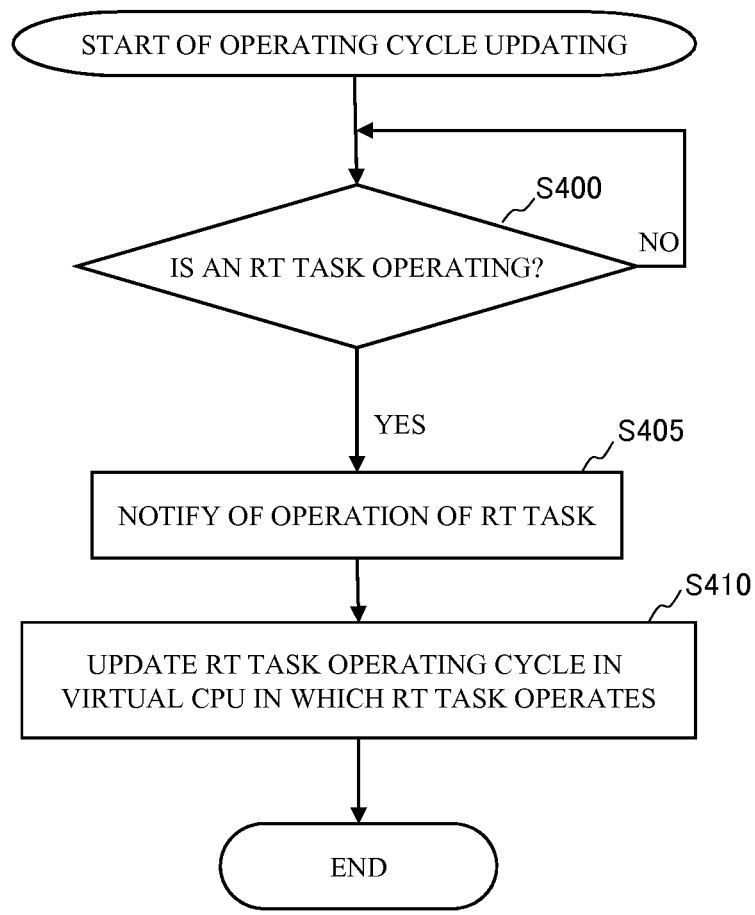
FIG. 15 shows the flow of operating cycle updating by an information processing system 1000b.

With reference to the flowchart in FIG. 15, the following describes operations for operating cycle updating by the virtual CPU load determining unit 205 for each managed RT task.

The real-time task execution notification unit 104 determines whether operations of an RT task included in a managed task queue have begun (step S400).

When determining that operations have begun (step S400: Yes), the real-time task execution notification unit 104 notifies the virtual CPU load determining unit 205 of time information on the RT task (step S405).

The virtual CPU load determining unit 205 receives the notification of the RT task whose operations have just begun from the real-time task execution notification unit 104 and, based on the time information that was just received and time information previously received, calculates the operating cycle for this managed RT task. The virtual CPU load determining unit 205 then updates the operating cycle for the RT task (step S410).

(2) Task Generation and Movement

Figure 16:
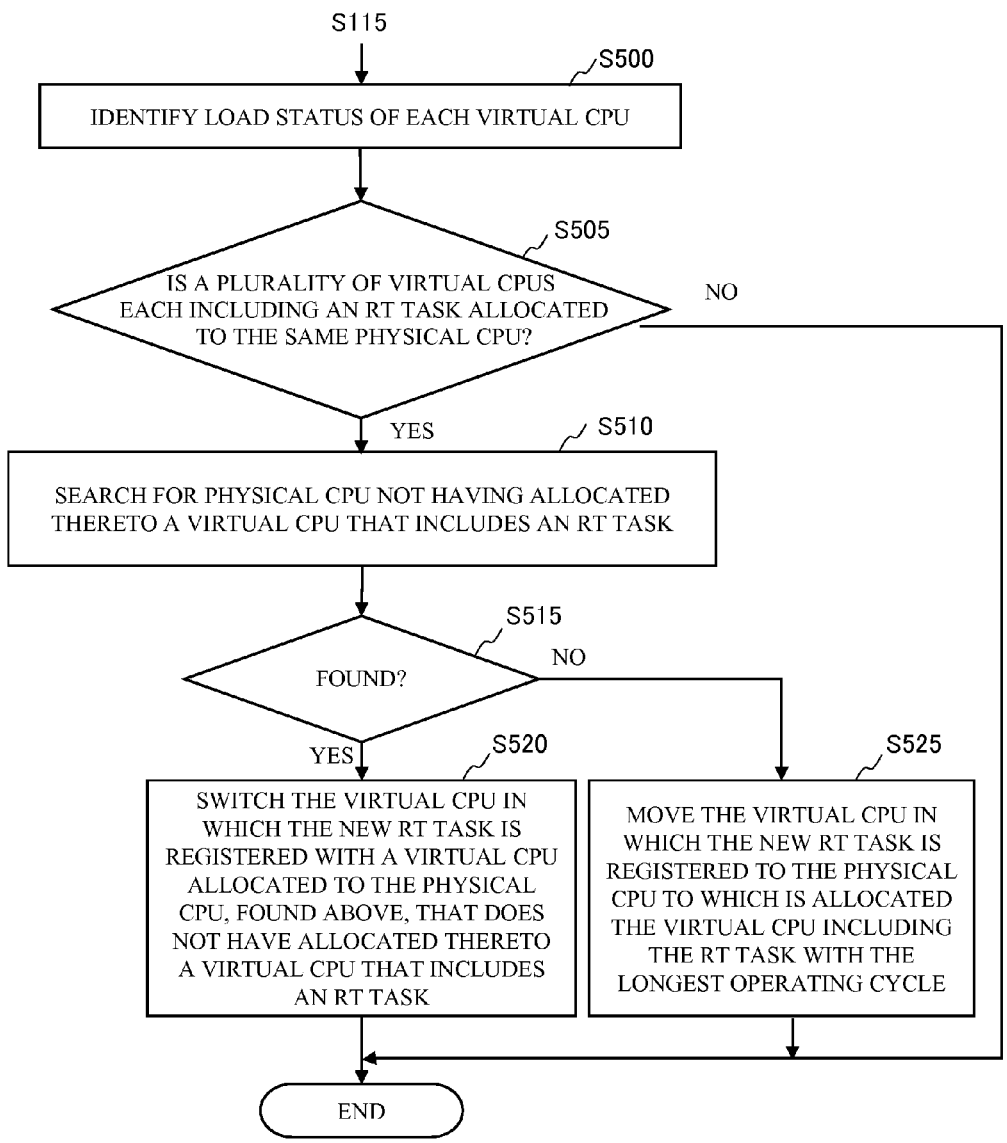
FIG. 16 shows operations by the information processing system 1000b for task generation and movement.

Operations by the information processing system 1000b for task generation and movement are now described with reference to the flowchart in FIG. 16, focusing on the differences with Embodiment 1.

First, the information processing system 1000b performs the processing from steps S100 through S115 in FIG. 6. Since this processing has already been described, further description is omitted here.

After completion of step S115, the virtual CPU load determining unit 205 identifies the current load status in each task queue upon receiving notification from the task information notification unit 103 (step S500).

The virtual CPU load balancing unit 206 determines whether a virtual CPU that includes a new RT task is allocated to the same physical CPU as another virtual CPU (step S505). Specifically, the virtual CPU load balancing unit 206 determines whether another virtual CPU is also allocated to the physical CPU to which the virtual CPU including the new RT task is allocated.

When determining positively (step S505: Yes), the virtual CPU load balancing unit 206 searches for a physical CPU to which no virtual CPU including an RT task is allocated (step S510).

When finding a physical CPU to which no virtual CPU including an RT task is allocated (step S515: Yes), the virtual CPU load balancing unit 206 identifies the physical CPU as having a low processing load. The virtual CPU load balancing unit 206 then reallocates, to this physical CPU, the other virtual CPU that is allocated to the same physical CPU as the virtual CPU that includes the new RT task.

As a result of the search in step S510, when not finding a physical CPU not having allocated thereto a virtual CPU that includes an RT task (step S515: No), the virtual CPU load balancing unit 206 moves the virtual CPU in which the new RT task is registered to the physical CPU having allocated thereto the virtual CPU that includes the RT task with the longest operating cycle (step S525).

When the determination in step S505 is negative (step S505: No), processing ends.

After the above processing is complete, the virtual CPU scheduling unit 202 determines the order of execution of the virtual CPUs allocated to each of the physical CPUs 1a-1c.

4. Embodiment 4

The following describes Embodiment 4, focusing on the differences from Embodiment 1. Note that constituent elements that are the same as in Embodiment 1 are indicated by the same reference signs.

FIG. 17 shows the structure of an information processing system 1000c according to Embodiment 4. In addition to the components of the information processing system 1000 shown in FIG. 1, the information processing system 1000c in FIG. 17 includes a virtual CPU processing capacity notification unit 207. Furthermore, the task load balancing unit 101 of the information processing system 1000 is replaced by a task load balancing unit 105.

4.1 Structure

(1) Virtual CPU Processing Capacity Notification Unit 207

The virtual CPU processing capacity notification unit 207 acquires information from the virtual CPU scheduling unit 202 on how much physical CPU time to allocate to a virtual CPU. For example, this information may indicate allocation of 50% of the physical CPU time.

The virtual CPU processing capacity notification unit 207 calculates the processing capacity of each of the virtual CPUs 6a-6d based on the time of the physical CPUs 1a-1c allocated thereto. The virtual CPU processing capacity notification unit 207 then notifies the task load balancing unit 105 of the calculated processing capacities.

(2) Task Load Balancing Unit 105

The task load balancing unit 105 balances the task load taking into consideration the processing capability of each CPU. Specifically, upon receiving information on the processing capability of each of the virtual CPUs 6a-6d from the virtual CPU processing capacity notification unit 207, the task load balancing unit 105 refers to the processing capacity of the virtual CPUs 6a-6d to suppress the allocation of tasks to a virtual CPU having a lower processing capacity than other virtual CPUs.

The task load balancing unit 105 thus suppresses allocation of tasks to a virtual CPU with little physical CPU time. If many virtual CPUs are allocated to a certain physical CPU, registration of a new RT task in a task queue of one of the virtual CPUs is suppressed. This prevents RT tasks from becoming concentrated in the physical CPU.

4.2 Operations

Task generation and movement by the information processing system 1000c is achieved by simply changing step S100 of the operations shown in FIG. 6 to a determination of where to register a new task based on the processing capability of each of the virtual CPUs 6a-6d. Therefore, a detailed description on these operations is omitted.

5. Modifications

The present invention has been described based on the above embodiments and modifications, but the present invention is in no way limited to the above embodiments and modifications. For example, the following modifications are possible.

(1) In the above embodiments, the information processing system determines where to move a new task upon generation thereof, but the information processing system is not limited in this way.

The information processing system may call the task load balancing unit at regular intervals and determine the movement of tasks between task queues to balance the load.

(2) In the above embodiments, the number of virtual machines is two, but the number is not limited to two.

The information processing system may be provided with three or more virtual machines.

(3) In the above embodiments, the virtual CPU scheduling unit determines the order of execution of tasks in the task queues by time sharing, but the present invention is not limited in this way.

An alternative form of virtual CPU scheduling is for the OS 20a and the OS 20b to notify the hypervisor 5 of completion of an RT task, and for the virtual CPU scheduling unit to continue execution of a virtual CPU that includes an RT task until receiving notification of completion.

(4) In the above embodiments, RT tasks and regular tasks are distinguished by priority, but priority is not the only way to distinguish between tasks.

For example, RT tasks may be distinguished from regular tasks by an OS having a function to distinguish RT tasks in some way other than by priority. Alternatively, when a priority of at least a certain degree is, as a matter of design, assigned to a task that requires real-time capability, any task with at least this certain degree of priority may be considered a real-time task.

An RT task in the present invention corresponds to a task that, based on the priority or type of the task, is treated as particularly requesting prioritized execution.

(5) In Embodiment 3, the time information is acquired from the OS task scheduler, but acquisition is not limited in this way.

If an OS records operation time of tasks, the information recorded by the OS may be used.

Alternatively, if time information on a real-time task is clear based on registration by the task registration unit of a task in the task queue, the task information notification unit may double as the real-time task execution notification unit.

(6) In Embodiment 3, the information used for reallocation is the operating cycle of each RT task, but reallocation is not limited in this way.

For example, a pseudo-cycle may be used as the average operation interval of an RT task. Alternatively, not only operating cycle, but also the operation time of an RT task may be used to balance the virtual CPUs.

(7) The functional blocks in the present invention are typically implemented as software, yet these functional blocks may be implemented as an LSI, a type of integrated circuit. The functional blocks may be implemented as individual chips. Alternatively, a portion or all of the functional blocks may be integrated into one chip. Although referred to here as an LSI, depending on the degree of integration, the terms IC, system LSI, super LSI, or ultra LSI are also used. In addition, the method for assembling integrated circuits is not limited to LSI, and a dedicated communication circuit or a general-purpose processor may be used. A Field Programmable Gate Array (FPGA), which is programmable after the LSI is manufactured, or a reconfigurable processor, which allows reconfiguration of the connection and setting of circuit cells inside the LSI, may be used. Furthermore, if technology for forming integrated circuits that replace LSIs emerges, owing to advances in semiconductor technology or to another derivative technology, the integration of functional blocks may naturally be accomplished using such technology.

(8) The above embodiments and modifications may be combined with one another.

6. Supplementary Explanation (1) An aspect of the present invention is an information processing system comprising: a plurality of operating systems each configured to perform execution control on processing tasks by assigning each task to a task group and causing all tasks assigned to a same task group to be executed on a same processor; and a hypervisor configured to associate each of a plurality of processors with one or more task groups in the operating systems and to cause each operating system to perform the execution control so that all tasks assigned to a same task group are executed on the processor associated with the same task group, the hypervisor including: an acquisition unit configured to sequentially acquire load indicators each indicating a processing load of each task group in each operating system; and a re-association unit configured to refer to the processing loads indicated by each load indicator acquired by the acquisition unit and, when determining that the processing loads are not balanced between the processors, to re-associate the processors with the task groups.

With the above structure, the information processing system re-associates the processors with the task groups when the processing loads are not balanced between the processors. This information processing system thus maintains balance in the processing loads across a plurality of processors.

(2) Each processing load may relate to any real-time tasks in the corresponding task group, a real-time task requiring processing in real time, and when the processing loads relating to real-time tasks are not balanced between the processors, the re-association unit may re-associate the processors with the task groups so as to balance the processing loads for real-time tasks.

With this structure, when the processing loads relating to real-time tasks are not balanced between the processors, the information processing system re-associates the processors with the task groups so as to balance the processing loads for real-time tasks. This information processing system thus maintains balance in the processing loads for real-time tasks. Since the processing loads for real-time tasks are maintained in balance, the demand for real-time processing of real-time tasks can be satisfied.

(3) The processing load relating to real-time tasks included in a task group may be a count of any real-time tasks included in the task group, and when counts of real-time tasks to be processed by the processors are not balanced between the processors, the re-association unit may re-associate the processors with the task groups so as to balance the counts of real-time tasks to be processed.

With this structure, the information processing system treats the number of real-time tasks as the processing load. The information processing system can thus easily identify the processing load on each processor.

(4) The re-association unit may determine that the processing load relating to real-time tasks is not balanced between the processors when at least two task groups among a plurality of task groups associated with a processor each include a real-time task, and may re-associate each of the at least two task groups with different processors.

With this structure, the information processing system maintains balance in the processing loads for real-time tasks by re-associating at least two task groups that are associated with the same processor. The at least two task groups are thus associated with different processors.

(5) The re-association unit may determine that the processing load is not balanced between the processors when one of a plurality of task groups associated with a processor includes a real-time task. The re-association unit may re-associate only the one of the plurality of task groups that includes a real-time task with the processor and re-associate the rest of the plurality of task groups with one or more different processors.

With this structure, the information processing system associates one task group including a real-time task with one processor. The need for scheduling with another task group that does not include a real-time task is thus eliminated, allowing for the demand for real-time processing of real-time tasks to be satisfied.

(6) The processing load may indicate an operation interval of each real-time task in each task group. The re-association unit may determine that the processing load is not balanced between processors when a processor is associated with a first task group and a second task group, a real-time task included in the first task group having a shorter operation interval than a real-time task included in the second task group, and may re-associate the second task group with a processor associated with a third task group that includes a real-time task with a longer operation interval than the real-time task included in the first task group.

With this structure, the information processing system re-associates the second task group with the processor with which the third task group is associated. The probability of competition between the real-time task in the second task group and the real-time task in the third task group is thus reduced.

(7) Upon receipt of an interrupt, when the interrupt is for a task included in a task group that includes a real-time task, the hypervisor may notify the operating system performing execution control of the task group including the real-time task.

With this structure, when an interrupt relating to a real-time task occurs, the information processing system immediately provides an interrupt notification, thus allowing for the demand for real-time processing of real-time tasks to be satisfied.

(8) Each task may be assigned a degree of priority for processing, and the re-association unit may determine, based on a total per task group of the degree of priority of each task included in the task group, that the processing loads are not balanced when totals of the degree of priority are not balanced between the processors, and may re-associate one of the processors with a different task group so as to average the totals of the degree of priority over the processors.

With this structure, the information processing system treats the total of the degree of priority of each task included in a task group as the processing load for the task group. The information processing system can thus easily identify the processing load on each processor.

(9) The hypervisor may further include a notification unit configured to notify each operating system, regarding each task group included in the operating system, of a processing capacity allocated to the task group in the processor associated with the task group. Upon generating a new task, each operating system may allocate the new task to a task group having a highest processing capacity among the notified processing capacities.

With this structure, the information processing system allocates a newly generated task based on the processing capacity allocated to each task group in each of the processors. When allocating tasks, the information processing system thus maintains balance in the processing loads across a plurality of processors.

(10) The hypervisor may further include a scheduling unit configured to determine, for each processor, a processing schedule for the one or more task groups associated with the processor, and the processing capacity may indicate a processing time for each task group based on the processing schedule.

With this structure, the information processing system allocates a newly generated task based on the processing schedule of each task group in each of the processors.

The information processing system according to the present invention is useful not only in large-scale computers and personal computers, but in any device that performs processing using a virtual machine, including household appliances such as digital televisions and storage/playback devices, communications devices, industrial devices, control devices, and vehicle-mounted devices.

REFERENCE SIGNS LIST 1a-1c physical CPU
2 I/O device
3 load balancing device
4a, 4b virtual machine
5 hypervisor
6a-6d virtual CPU
100a-100d task queue
101 task load balancing unit
102 task registration unit
103 task information notification unit
200 virtual CPU load determining unit
201 virtual CPU load balancing unit
202 virtual CPU scheduling unit
1000 information processing system

The invention claimed is:

1. An information processing system comprising:
a plurality of processors;
a hypervisor configured to associate each of the plurality of processors with one or more task groups which are constituted within one or more task queues of a plurality of operating systems;
the hypervisor to cause each operating system to perform execution control so that all tasks included in each task group are executed on the processor associated with the task group;
each of the one or more task groups comprising at least one of a real-time task and a non-real-time task wherein real-time tasks requiring processing in real time within an operation interval;
the hypervisor including:
an acquisition unit configured to acquire load indicators indicating a processing load of each task group in each operating system; and
a re-association unit configured to evaluate the processing loads indicated by each load indicator acquired by the acquisition unit and, when determining that the processing loads are not balanced between the plurality of processors, to re-associate the plurality of processors with the one or more task groups;
the re-association unit re-associating the plurality of processors with the one or more task groups when the processing loads relating to real-time tasks included in a task group of the one or more task groups are not balanced between the plurality of processors, so as to balance the processing loads for real-time tasks;
each processing load indicating the operation interval of each real-time task in the corresponding task group;
the re-association unit determines that the processing loads are not balanced between the plurality of processors by evaluating the operation intervals of the real-time tasks in the corresponding task groups and determining that a given processor is associated with a first task group and a second task group, and the first task group has a real-time task having a shortest operation interval among the real-time tasks in the first and second tasks groups; and re-associating the second task group with a processor of the plurality of processors that is other than the given processor and is associated with a third task group that does not have a real-time task.

2. The information processing system of claim 1, wherein each processing load relating to real-time tasks included in a task group also depends on a number of real-time tasks included in the task group, and when the number of real-time tasks to be processed by the processors are not balanced between the processors, the re-association unit re-associates the processors with the task groups so as to balance the number of real-time tasks to be processed.

3. The information processing system of claim 1, wherein the re-association unit determines that the processing loads relating to real-time tasks are not balanced between the processors when at least two task groups among a plurality of task groups associated with a processor each include a real-time task, and re-associates each of the at least two task groups with different processors.

4. The information processing system of claim 1, wherein the re-association unit determines that the processing loads relating to real-time tasks are not balanced between the processors when one of a plurality of task groups associated with a processor includes a real-time task, and re-associates only the one of the plurality of task groups that includes a real-time task with the processor and re-associates the rest of the plurality of task groups with one or more different processors.

5. The information processing system of claim 1, wherein upon receipt of an interrupt, when the interrupt is for a task included in a task group that includes a real-time task, the hypervisor notifies the operating system performing execution control of the task group including the real-time task.

6. The information processing system of claim 1, wherein each task is assigned a degree of priority for processing, and the re-association unit determines, based on a total of the degree of priority of each task included in each task group, that the processing loads are not balanced when totals of the degree of priority are not balanced between the processors, and re-associates one of the processors with a different task group so as to average the totals of the degree of priority over the processors.

7. The information processing system of claim 1, wherein the hypervisor further includes a notification unit configured to notify each operating system, regarding each task group included in the operating system, of a processing capacity allocated to the task group in the processor associated with the task group, and upon generating a new task, each operating system allocates the new task to a task group having a highest processing capacity among the notified processing capacities.

8. The information processing system of claim 7, wherein the hypervisor further includes a scheduling unit configured to determine, for each processor, a processing schedule for the one or more task groups associated with the processor, and the processing capacity indicates a processing time for each task group based on the processing schedule.

9. The information processing system of claim 1, wherein each of the first, second and third task groups is associated with a virtual CPU, and each virtual CPU is associated with a physical processor such as the given processor and the processor other than the given processor.

10. The information processing system of claim 9, wherein the determining that the processing loads are not balanced between the processors also includes determining a number of virtual CPUs associated with a task group having a real-time task that are allocated to each physical processor.

11. The information processing system of claim 9, wherein in the re-associating of the second task group includes searching for another physical processor that is associated with a task group that does not include a real-time task and is considered to have a low processing load.

12. A processing method used in an information processing system, the information processing system comprising:

a hypervisor configured to associate each of a plurality of processors with one or more task groups which are constituted within one or more task queues of a plurality of operating systems;

the hypervisor to cause each operating system to perform execution control so that all tasks included in each task group are executed on the processor associated with the task group;

each of the one or more task groups comprising at least one of a real-time task and a non-real-time task wherein real-time tasks requiring processing in real time within an operation interval;

the processing method being used by the hypervisor and comprising the steps of:

acquiring load indicators indicating a processing load of each task group in each operating system; and evaluating the processing loads indicated by each load indicator acquired in the acquisition step and, when determining that the processing loads are not balanced between the plurality of processors, re-associating the plurality of processors with the one or more task groups, the plurality of processors being re-associated with the one or more task groups in the re-associating step when the processing loads relating to real-time tasks included in a task group of the one or more task groups are not balanced between the plurality of processors, so as to balance the processing loads for real-time tasks;

each processing load indicating the operation interval of each real-time task in the corresponding task group;

determining that the processing loads are not balanced between the plurality of processors by evaluating the operation intervals of the real-time tasks in the corresponding task groups and determining that a given processor is associated with a first task group and a second task group, and the first task group has a real-time task having a shortest operation interval among the real-time tasks in the first and second tasks groups; and re-associating the second task group with a processor of the plurality of processors that is other than the given processor and a third task group that does not have a real-time task.

13. A non-transitory computer-readable recording medium storing a processing program used in an information processing system, the information processing system comprising:

a hypervisor configured to associate each of a plurality of processors with one or more task groups which are constituted within one or more task queues of a plurality of operating systems;

the hypervisor to cause each operating system to perform execution control so that all tasks included in each task group are executed on the processor associated with the task group;

each of the one or more task groups comprising at least one of a real-time task and a non-real-time task wherein real-time tasks requiring processing in real time within an operation interval;

the processing program being used by the hypervisor and causing a computer to perform the steps of:

acquiring load indicators indicating a processing load of each task group in each operating system; and evaluating the processing loads indicated by each load indicator acquired in the acquisition step and, when determining that the processing loads are not balanced between the plurality of processors, re-associating the plurality of processors with the one or more task groups;

the plurality of processors being re-associated with the one or more task groups in the re-associating step when the processing loads relating to real-time tasks included in a task group of the one or more task groups are not balanced between the plurality of processors, so as to balance the processing loads for real-time tasks;

each processing load indicating the operation interval of each real-time task in the corresponding task group;

determining that the processing loads are not balanced between the plurality of processors by evaluating the operation intervals of the real-time tasks in the corresponding task groups and determining that a given processor is associated with a first task group and a second task group, and the first task group has a real-time task having a shortest operation interval among the real-time tasks in the first and second tasks groups; and re-associating the second task group with a processor of the plurality of processors that is other than the given processor and a third task group that does not have a real-time task.

14. An integrated circuit comprising:

a hypervisor configured to associate each of a plurality of processors with one or more task groups which are constituted within one or more task queues of a plurality of operating systems;

the hypervisor to cause each operating system to perform execution control so that all tasks included in each task group are executed on the processor associated with the task group;

each of the one or more task groups comprising at least one of a real-time task and a non-real-time task wherein real-time tasks requiring processing in real time within an operation interval;

the hypervisor including:

an acquisition unit configured to acquire load indicators indicating a processing load of each task group in each operating system; and a re-association unit configured to evaluate the processing loads indicated by each load indicator acquired by the acquisition unit and, when determining that the processing loads are not balanced between the plurality of processors, to re-associate the plurality of processors with the one or more task groups;

the re-association unit re-associating the plurality of processors with the one or more task groups when the processing loads relating to real-time tasks included in a task group of the one or more task groups are not balanced between the plurality of processors, so as to balance the processing loads for real-time tasks;

each processing load indicating the operation interval of each real-time task in the corresponding task group;

the re-association unit determines that the processing loads are not balanced between the plurality of processors by evaluating the operation intervals of the real-time tasks in the corresponding task groups and determining that a given processor is associated with a first task group and a second task group, and the first task group has a real-time task having a shortest operation interval among the real-time tasks in the first and second tasks groups; and re-associating the second task group with a processor of the plurality of processors that is other than the given processor and is associated with a third task group that does not have a real-time task.

* * * * *